United States Patent
Kawahara et al.

(10) Patent No.: US 8,947,023 B2
(45) Date of Patent: Feb. 3, 2015

(54) BATTERY CONTROL DEVICE AND MOTOR DRIVE SYSTEM

(75) Inventors: Youhei Kawahara, Hitachi (JP); Akihiko Emori, Hitachi (JP); Akihiko Kudo, Hitachinaka (JP); Atsuo Suga, Yokohama (JP); Masato Isogai, Mito (JP); Kenji Kubo, Hitachi (JP)

(73) Assignees: Hitachi, Ltd., Tokyo (JP); Hitachi Automotive Systems, Ltd., Hitachinaka-shi (JP)

( * ) Notice: Subject to any disclaimer, the term of this patent is extended or adjusted under 35 U.S.C. 154(b) by 284 days.

(21) Appl. No.: 13/501,817

(22) PCT Filed: Oct. 14, 2009

(86) PCT No.: PCT/JP2009/067794
§ 371 (c)(1),
(2), (4) Date: Jun. 22, 2012

(87) PCT Pub. No.: WO2011/045853
PCT Pub. Date: Apr. 21, 2011

(65) Prior Publication Data
US 2012/0256569 A1    Oct. 11, 2012

(51) Int. Cl.
*H02P 1/00* (2006.01)
*H01M 10/44* (2006.01)
(Continued)

(52) U.S. Cl.
CPC ........ *H01M 10/486* (2013.01); *H01M 10/5004* (2013.01); *H01M 10/502* (2013.01); *H01M 10/5067* (2013.01); *B60K 2001/005* (2013.01)
USPC ........... 318/139; 320/144; 320/150; 320/153; 320/158; 320/127; 429/50; 429/11; 429/442; 429/62; 429/305; 361/5; 361/6; 361/18; 361/30

(58) Field of Classification Search
CPC .................. H01M 2010/4271; Y02T 10/7044; Y02T 10/92
USPC ......... 320/136, 132, 150, 144, 153, 158, 127, 320/137, 134; 429/50; 514/26; 361/5, 6, 18, 361/30; 318/139; 702/63, 58; 700/292, 294
See application file for complete search history.

(56) References Cited

U.S. PATENT DOCUMENTS 4,325,010 A * 4/1982 Lowndes ...................... 318/139
7,405,526 B2 * 7/2008 Sato ............................. 318/139
(Continued)

FOREIGN PATENT DOCUMENTS

JP    9-245846 A    9/1997
JP    11-162526 A   6/1999
(Continued)

OTHER PUBLICATIONS

Corresponding International Search Report with English Translation dated Jan. 19, 2010 (five (5) pages).

*Primary Examiner* — Rita Leykin
*Assistant Examiner* — Zemenay Truneh
(74) *Attorney, Agent, or Firm* — Crowell & Moring LLP

(57) ABSTRACT

In a memory, the surface temperature and the internal resistance of an assembled battery detected under the condition where a difference between the surface and the internal temperature is within a predetermined value are stored, and an internal temperature diagnosis unit that diagnoses whether or not the internal temperature estimated by an internal temperature estimation unit is correct, detects the internal resistance with an internal resistance calculation unit when the internal temperature estimation unit estimates the internal temperature, searches for an internal resistance corresponding to the surface temperature equal to the estimated internal temperature value from among the stored internal resistances, and diagnoses the estimated internal temperature value based upon the result of comparison of a search result of the internal resistance and the internal resistance detected during internal temperature estimation.

13 Claims, 26 Drawing Sheets

(51) Int. Cl.
    *H01M 10/48*     (2006.01)
    *H01M 10/613*    (2014.01)
    *H01M 10/63*     (2014.01)
    *H01M 10/6563*   (2014.01)
    *B60K 1/00*          (2006.01)

(56) References Cited

U.S. PATENT DOCUMENTS

| | | | | |
|---|---|---|---|---|
| 7,974,797 | B2 * | 7/2011 | Shoji | 702/63 |
| 8,110,303 | B2 * | 2/2012 | Yata et al. | 429/162 |
| 8,404,385 | B2 * | 3/2013 | Yamamoto et al. | 429/231.8 |
| 8,771,866 | B2 * | 7/2014 | Yoon | 429/163 |
| 8,775,105 | B2 * | 7/2014 | Lin et al. | 702/63 |
| 2002/0119364 | A1 * | 8/2002 | Bushong et al. | 429/61 |
| 2003/0003363 | A1 * | 1/2003 | Daido et al. | 429/231.95 |
| 2006/0251955 | A1 * | 11/2006 | Yata et al. | 429/50 |
| 2008/0234956 | A1 | 9/2008 | Mizuno et al. | |
| 2009/0130538 | A1 * | 5/2009 | Kaita et al. | 429/50 |
| 2014/0167656 | A1 * | 6/2014 | Yamada | 318/139 |

FOREIGN PATENT DOCUMENTS

| | | | | |
|---|---|---|---|---|
| JP | 2001-76769 | A | 3/2001 | |
| JP | 2001-85071 | A | 3/2001 | |
| JP | 2001076769 | A * | 3/2001 | H01M 10/48 |
| JP | 2003-47159 | A | 2/2003 | |
| JP | 2007-311065 | A | 11/2007 | |
| JP | 2007311065 | A * | 11/2007 | |
| JP | 2008-65989 | A | 3/2008 | |
| JP | 2008065989 | A * | 3/2008 | |
| JP | 2008-204801 | A | 9/2008 | |
| JP | 2008-232758 | A | 10/2008 | |
| JP | 2008-271781 | A | 11/2008 | |

* cited by examiner

BATTERY CONTROL DEVICE AND MOTOR DRIVE SYSTEM

TECHNICAL FIELD

The present invention relates to a battery control device, and to a motor drive system that employs such a battery control device.

BACKGROUND ART

With a power supply device, a distributed type energy storage device, an electric automobile, or the like that employs a battery, in order to use the battery optimally and effectively, a control device is used that detects the state of the battery and controls charging and discharging of the battery. For the state of the battery, there may be employed its state of charge that represents the what amount the battery is charged or what amount of electric charge that can be discharged remains (hereinafter termed its "SOC", these being the initial letters of "State Of Charge"), what amount of charge remains, its state of health that represents what extent the battery has deteriorated or has weekend (hereinafter termed its "SOH", these being the initial letters of "State Of Health") or the level of deterioration, or the like.

In order to detect the state of the battery, the battery control device performs processing to obtain the SOC and/or the SOH and/or the like on the basis of information that is measured, such as the voltage, the current, the temperature and so on of the battery. Generally the temperature of the battery among the measured information is obtained by measuring the surface temperature via a temperature sensor installed upon the surface of the battery, and is used for the processing for detecting the state of the battery. If it is possible to use the internal temperature of the battery, i.e. the true temperature of its cells, in the processing for detecting the state of the battery, then it is possible to perform detection of the battery state, such as its SOC or SOH, more accurately.

An internal temperature detection device for a battery is known, with which it is arranged to estimate the internal temperature of the battery without fitting any temperature sensor directly to the interior of the battery (for example, refer to Patent Document #1). With this device, the internal temperature of the battery is estimated from the surface temperature of the battery and from the output of a fan that is used for cooling the battery.

CITATION LIST

Patent Literature

Patent Document #1: Japanese Laid-Open Patent Publication Heisei 09-245846.

SUMMARY OF THE INVENTION

Technical Problem

However, in the internal temperature estimation of a battery by the prior art battery control device described above, no diagnosis is made as to whether the result of estimation of the internal temperature of the battery is correct or not, so that there is some doubt as to the reliability of the result of internal temperature estimation.

The present invention provides a method for diagnosis of such a result of estimating the internal temperature of a battery, which is necessary in order to detect the state of the battery with good accuracy.

Solution to Problem

According to the 1st aspect of the present invention, a battery control device comprises: an internal resistance detection unit that detects the internal resistance of a battery; a surface temperature detection unit that detects the surface temperature of the battery; an internal temperature estimation unit that estimates the internal temperature of the battery; a data storage unit that stores the surface temperature detected by the surface temperature detection unit and the internal resistance detected by the internal resistance detection unit in mutual correspondence, the surface temperature and the internal temperature being detected under a condition in which a difference between the surface temperature of the battery and the internal temperature of the battery is within a predetermined value; and an internal temperature diagnosis unit that diagnoses whether or not the internal temperature of the battery estimated by the internal temperature estimation unit is correct; wherein the internal temperature diagnosis unit, along with detecting with the internal resistance detection unit the internal resistance when the internal temperature was estimated by the internal temperature estimation unit, also searches for the internal resistance that corresponds to the surface temperature that is equal to the estimated internal temperature value from among the internal resistances stored in the data storage unit, and diagnoses the estimated internal temperature value on the basis of the result of comparison between the internal resistance that is a result of this search and the internal resistance detected during this internal temperature estimation.

According to the 2nd aspect of the present invention, in the battery control device according to the 1st aspect, the internal temperature diagnosis unit diagnoses that the estimated internal temperature value is anomalous if a difference between the internal resistance that is the result of the search and the internal resistance during this internal temperature estimation is greater than a predetermined value.

According to the 3rd aspect of the present invention, the battery control device according to the 1st or the 2nd aspect further comprises: a state determination unit that makes a decision as to whether or not the condition in which the difference between the surface temperature of the battery and its internal temperature is within the predetermined value is satisfied; and a data accumulation unit that stores the surface temperature detected by the surface temperature detection unit and the internal resistance detected by the internal resistance detection unit in mutual correspondence if the state determination unit decides that the condition is satisfied.

According to the 4th aspect of the present invention, in the battery control device according to the 3rd aspect, the state determination unit comprises a surrounding temperature detection unit that detects a temperature of surroundings of the battery, and decides that the condition is satisfied if a difference between a value of the surface temperature detected by the surface temperature detection unit and a value of the surrounding temperature detected by the surrounding temperature detection unit is within a predetermined value.

According to the 5th aspect of the present invention, the battery control device according to the 3rd or the 4th aspect further comprises a data updating unit that, along with detecting the surface temperature of the battery by the surface temperature detection unit, also detects the internal resistance of the battery with the internal resistance detection unit, and updates the surface temperature and the internal resistance stored in the data storage unit on the basis of a value of this detected surface temperature and a value of this detected internal resistance when the state determination unit determines that the condition is satisfied.

According to the 6th aspect of the present invention, in the battery control device according to any one of the 1st through the 5th aspect, the internal temperature estimation unit comprises: a surrounding temperature detection unit that detects a temperature of surroundings of the battery; and a speed of draft detection unit that detects the speed of draft of a cooling fan that cools the battery; and the internal temperature estimation unit estimates the internal temperature of the battery on the basis of a value of the surface temperature detected by the surface temperature detection unit, a value of the surrounding temperature detected by the surrounding temperature detection unit, a value of the speed of draft detected by the speed of draft detection unit, and a parameter for internal temperature estimation.

According to the 7th aspect of the present invention, in the battery control device according to the 6th aspect, the parameter for internal temperature estimation is configured to be a slope that primarily functions to specify the relationship of a difference between the internal temperature of the battery and the temperature of surroundings the battery with respect to a difference between the surface temperature of the battery and the temperature of surroundings of the battery, and to have a value that corresponds to the speed of the cooling draft; and the internal temperature estimation unit corrects the parameter for internal temperature estimation, if the internal temperature diagnosis unit diagnoses that the estimated internal temperature value is anomalous.

According to the 8th aspect of the present invention, a motor drive system according to any one of the 1st through the 7th aspects further comprises a current limitation unit that limits charging or discharging current flowing in the battery, if the internal temperature diagnosis unit of the battery control device diagnoses that the estimated internal temperature value is anomalous.

According to the 9th aspect of the present invention, a motor drive system comprises: a battery; a draft blowing unit that blows a cooling air draft through a filter against the battery; and a battery control device according to any one of the 1st through the 8th aspects.

According to the 10th aspect of the present invention, the motor drive system according to the 9th aspect further comprise a cause specification unit that, specifies a cause of an anomaly of a value of the estimated internal temperature on the basis of magnitude relationship between a value of the internal resistance and a value of the searched internal resistance if the internal temperature diagnosis unit diagnoses that value of the estimated internal temperature is anomalous, the value of the estimated internal temperature being detected by the internal resistance detection unit when the internal temperature was estimated by the internal temperature estimation unit, and the value of the searched internal resistance that corresponds to the surface temperature equal to the value of the estimated internal temperature being searched from the data storage unit.

According to the 11th aspect of the present invention, in the motor drive system according to the 10th aspect, the cause specification unit: specifies that the cause is insufficiency of the speed of the draft blown by the draft blowing unit, or that the filter is clogged, if the value of the detected internal resistance is larger than the value of the searched internal resistance; and specifies that the cause is that the speed of the draft blown by the draft blowing unit is excessively great, or the battery has swollen if the value of the detected internal resistance is smaller than the value of the searched internal resistance.

Advantageous Effect of the Invention

It is possible accurately to assess the reliability of the result of estimation of the internal temperature of the battery, and as a result it is possible to detect the state of the battery accurately on the basis of an estimated internal temperature result whose reliability is high, and it is possible to utilize the battery optimally and effectively.

DESCRIPTION OF EMBODIMENT

Embodiment #1

Figure 1:
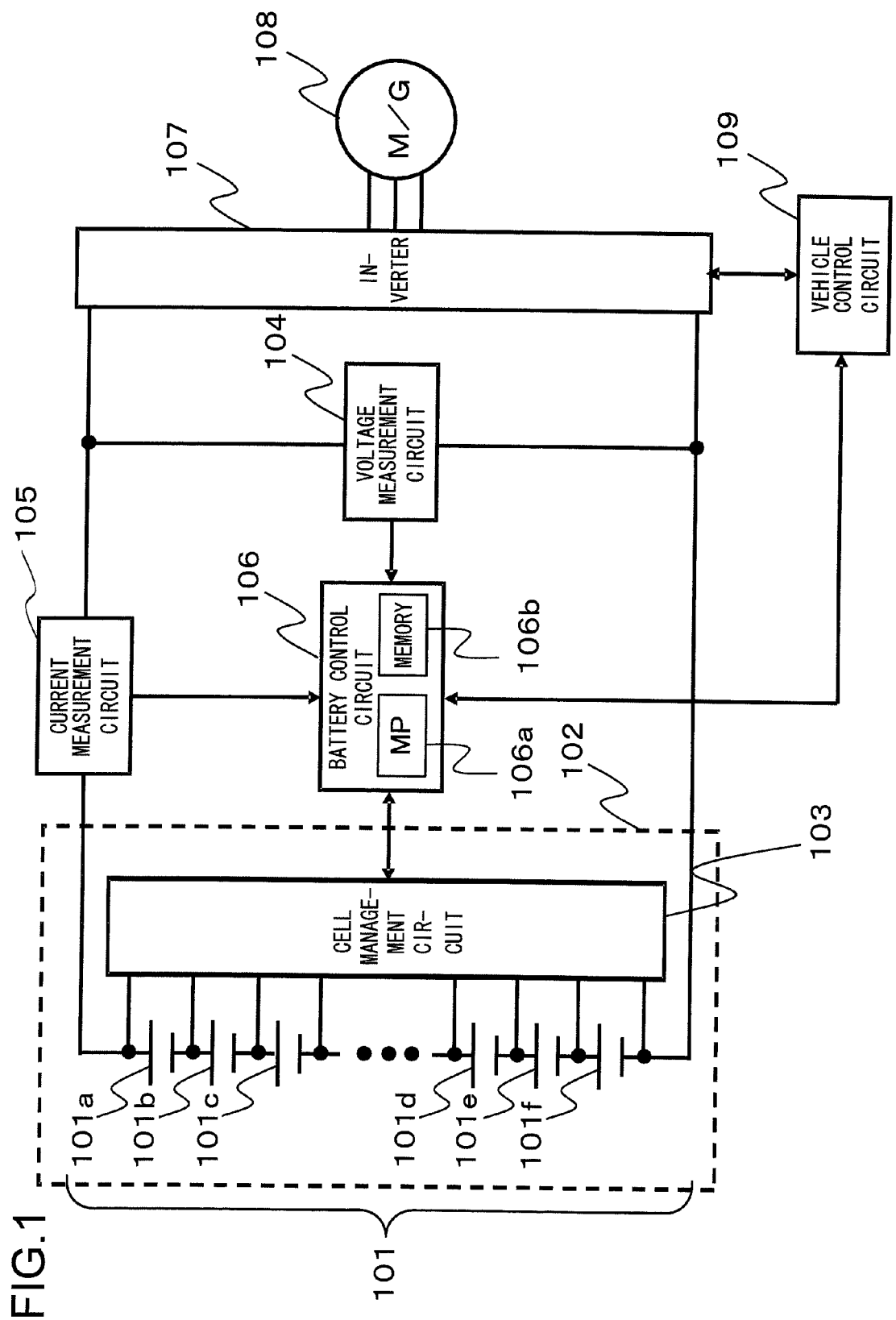
FIG. 1 is an overall structural diagram showing an example of a motor drive system that uses a battery control device according to the present invention.

FIG. 1 is an overall structural diagram showing an example of a motor drive system that uses a battery control device according to the present invention. In this first embodiment, there are included: an assembled battery 101 in which a plurality of battery cells 101a, 101b, . . . that accumulate energy and perform discharging of electricity are connected in series; a cell management circuit 103 that manages each of the plurality of battery cells 101a, 101b, . . . ; a voltage measurement circuit 104 that measures the voltage between the two end terminals of the assembled battery 101; a current measurement circuit 105 that measures the current flowing out of and into the assembled battery 101; a battery control circuit 106 that detects the state of the assembled battery 101 and the state of a battery module 102 in which the assembled battery 101 and the cell management circuit 103 are housed on the basis of information inputted from the cell management circuit 103, the voltage measurement circuit 104, and the current measurement circuit 105; an inverter 107 that is a power conversion device that converts electrical power from DC into AC or from AC into DC; a motor-generator (M/G) 108 that functions as a motor during power running and that functions as a generator during electricity generation (i.e. during regeneration); and a vehicle control circuit 109 that performs control of the inverter 107 on the basis of information from the battery control circuit 106.

For the battery cells 101a, 101b, . . . , electricity storage devices such as lithium ion cells, nickel hydrogen cells, lead cells, double layer electric capacitors or the like may be used. While FIG. 1 shows an example in which the high voltage assembled battery 101 is made up of the plurality of battery cells 101a, 101b, . . . that are connected in series, it would also be acceptable to arrange for a high voltage high capacity battery to be made up of a plurality of battery cells that are connected in series-parallel. It should be understood that while the assembled battery 101 in which the plurality of battery cells 101a, 101b, . . . , are connected in series or in series-parallel is treated as a single battery in this embodiment, it would of course also be acceptable for the assembled battery 101 to consist of a single battery cell or a single electric storage device.

The cell management circuit 103 is endowed with the function of detecting the voltage and the temperature of each of the battery cells 101a, 101b, . . . of the assembled battery 101 that is housed in the battery module 102, and also of detecting information relating to anomaly thereof. Moreover, while this feature is not shown in FIG. 1, if variation has occurred between the voltages of the various battery cells 101a, 101b, . . . , then the cell management circuit 103 performs processing to forcibly electrically discharge only those ones of the battery cells 101a, 101b, . . . that are at high voltage, or the like, so as to equalize the voltages of the battery cells 101a, 101b, . . . within the battery module 102. It will be acceptable for this function of the cell management circuit 103 for detecting the voltages, temperatures and anomaly information and so on and for equalizing the voltages to be performed according to a command from the battery control circuit 106; or, alternatively, it will also be acceptable to arrange for the processing described above to be performed according to a decision made by the cell management circuit 103 autonomously. Furthermore, while FIG. 1 shows an example in which the cell management circuit 103 is installed within the battery module 102, it would also be acceptable for the cell management circuit 103 to be installed outside the battery module 102.

The voltage measurement circuit 104 and the current measurement circuit 105 consist of sensors and electrical circuitry, with the voltage measurement circuit 104 being endowed with the function of measuring the voltage of the assembled battery 101 (this is the total of the voltages of the battery cells 101a, 101b, . . . that are connected in series, and hereinafter will be termed the battery voltage), while the current measurement circuit 105 is endowed with the function of measuring the current flowing out of or into the assembled battery 101 (in the following, this will be termed the charging/discharging current or simply the battery current). The results of these measurements are transmitted to the battery control circuit 106, and are used in calculations of various types for detecting the state of the battery. It should be understood that, while here an example is shown in which the voltage measurement circuit 104 and the current measurement circuit 105 are installed outside the battery control circuit 106, it would also be acceptable to arrange for these to be built integrally with the battery control circuit 106.

The battery control circuit 106 consists of a microprocessor 106a and peripheral devices such as a memory 106b and so on, and detects states of the assembled battery 101 and the battery module 102 on the basis of information related to the assembled battery 101 and the battery module 102 measured by the cell management circuit 103, by the voltage measurement circuit 104, and by the current measurement circuit 105. The above described SOC, the SOH, the permitted current or the permitted power, anomaly information, and so on may be included in the states that are detected. The detailed processing for detecting these states will be described hereinafter. The results of state detection are transmitted to the vehicle control circuit 109 that controls the inverter 107, and the vehicle control circuit 109 performs charging and discharging control of the assembled battery 101 on the basis of the results of detection of the state of the battery that it receives.

The inverter 107 is a drive control device for the motor-generator 108, and converts electrical power from DC to AC and from AC to DC according to the operation of semiconductor switching elements that are housed internally. When the motor-generator 108 is operating as a motor for power running, it operates upon electrical energy that is supplied from the assembled battery 101 via the inverter 107, thus generates rotational power (mechanical energy) due to electromagnetic operation, and supplies this rotational power to a load. On the other hand, when the motor-generator 108 is operating as a generator and is generating electricity by regeneration, it generates electrical power and supplies this power to the assembled battery 101 via the inverter 107, the assembled battery 101 is charged up.

The vehicle control circuit 109 is endowed with the function of controlling the inverter 107 on the basis of information from the battery control circuit 106, and performs charging and discharging control of the assembled battery 101 on the basis of the result of detection of the state of the battery from the battery control circuit 106. Just like the battery control recruit 106, this vehicle control circuit 109 consists of a microprocessor and peripheral devices such as a memory and so on, and communication between the battery control circuit 106 and the vehicle control circuit 109 is performed bidirectionally via an onboard network, of which LIN, CAN, and FlexRay are representative. It should be understood that it would also be acceptable to integrate the functions of the battery control circuit 106 and of the vehicle control circuit 109 together into a single controller.

Figure 2:
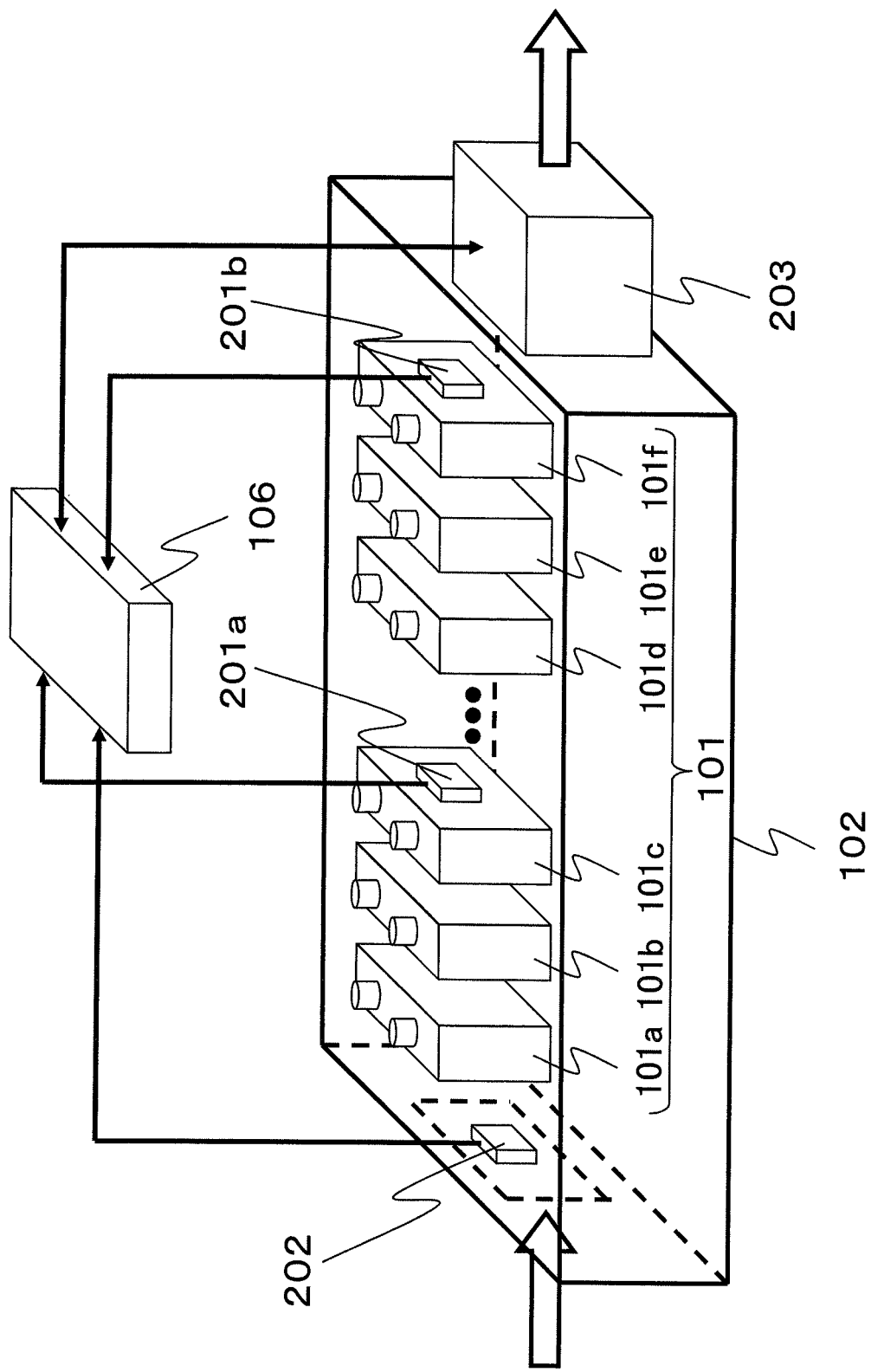
FIG. 2 is a perspective view showing the structure of a battery module 102.

FIG. 2 is a perspective view showing the structure of the battery module 102. The assembled battery 101 is stored within the casing of this battery module 102, and to some of its internal battery cells (in the example shown in FIG. 2, to 101c and 101f) there are installed first temperature measurement units 201 for measuring surface temperatures T1 (a first temperature measurement unit 201a is installed to the battery cell 101c, and a second temperature measurement unit 201b is installed to the battery cell 101f). It should be understood that it would also be acceptable to install first temperature measurement units 201 to all of the battery cells 101a, 101b, ... within the battery module 102. Moreover, a second temperature measurement unit 202 is also installed within the battery module 102 for measuring the temperature T2 within the battery module 102, in other words the temperature in the location where the assembled battery 101 is installed (i.e. the temperature of the surroundings of the battery 101). The information relating to the battery surface temperatures T1 and the temperature T2 of the battery surroundings detected by these first and second temperature measurement units 201 and 202 is sent to the battery control circuit 106. It should be understood that while this first embodiment shows an example in which the temperature information detected by the first and second temperature measurement units 201 and 202 is directly transmitted to the battery control circuit 106, it would also be acceptable to arrange for it to be transmitted via the cell management circuit 103 (refer to FIG. 1) that is installed in the interior of the battery module 102. The temperature information that has thus been detected is used as input to the processing within the battery control circuit 106, as will be described hereinafter.

A fan 203 for cooling the assembled battery 101 may be installed outside of or within (not illustrated) the casing of the battery module 102. A signalling system connects in both directions between the fan 203 and the battery control circuit 106, and, if it is decided that it is necessary to cool the assembled battery 101 with the fan 203, then the battery control circuit 106 transmits a signal for driving the fan 203, and on the basis thereof the fan 203 cools the assembled battery 101 by air cooling. Moreover, information about the operation of the fan 203 is transmitted to the battery control circuit 106, and due thereto it is possible for the battery control circuit 106 to check the operation of the fan 203. The rotational speed of the fan 203 is included in the information about the operation of the fan 203, and the battery control circuit 106 obtains the speed of draft W of the cooling draft by calculation on the basis of this rotational speed signal that has been inputted from the fan 203. It should be understood that it would also be acceptable to install a dedicated speed of draft sensor to the air intake or the exhaust aperture or the like of the battery module 102, so as to detect the speed of draft W of the cooling draft. The conditions for starting to cool the assembled battery 101 with the fan 203 may include: the case in which the average temperature or the highest temperature of the battery cells 101a, 101b, ... within the battery module 102 exceeds some threshold value that is determined in advance; the case in which the change of temperature that has occurred during charging or discharging of the battery module 102 from before it was being charged or discharged has exceeded some threshold value; the case in which the variation in the temperatures of the battery cells 101a, 101b, ... housed in the battery module 102 has exceeded some threshold value, or the like. It should be understood that it would also be acceptable to arrange for the drive control of the fan 203 to be performed by a control device that is separate from the battery control circuit 106.

Figure 3:
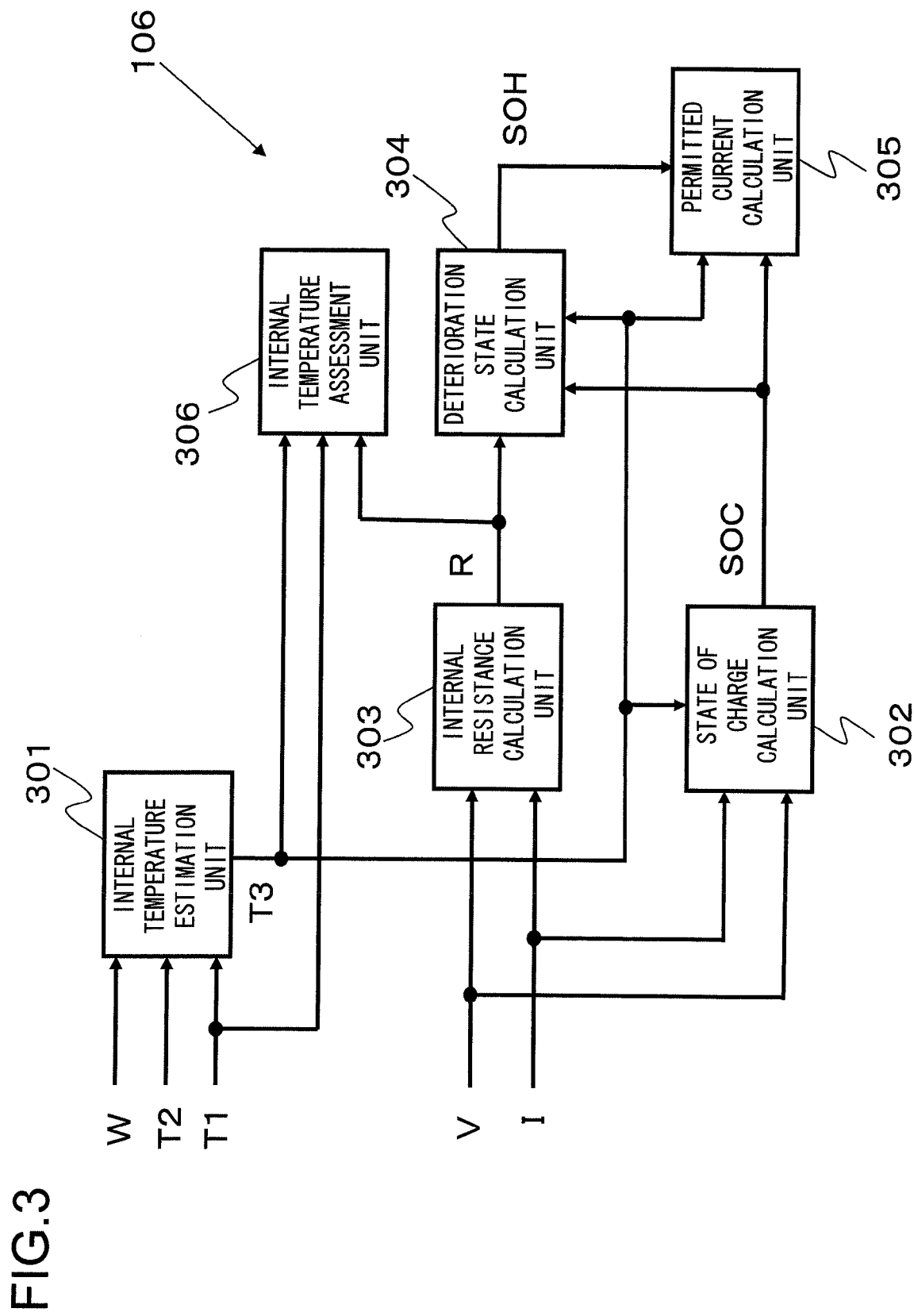
FIG. 3 is a block diagram showing the details of processing by a battery control circuit 106 of a first embodiment.

FIG. 3 is a block diagram showing details of the processing performed by the battery control circuit 106. The battery control circuit 106 includes an internal temperature estimation unit 301, a state of charge calculation unit 302, an internal resistance calculation unit 303, a deterioration state calculation unit 304, a permitted current calculation unit 305, and an internal temperature diagnosis unit 306, all of which are implemented in the form of software for the microprocessor 106a. The internal temperature estimation unit 301 inputs the battery surface temperatures T1 measured by the first temperature measurement units 201, the temperature T2 of the battery surroundings measured by the second temperature measurement unit 202, and the speed of the draft W experienced by the assembled battery 101 housed within the battery module 102, and estimates from these the internal temperature T3 of the battery cells 101a, 101b, .... It should be understood that, in this embodiment, the average value of the internal temperatures of the battery cells 101a, 101b, ... is considered as being the estimated result T3 for the internal temperature of the assembled battery 101. And the state of charge calculation unit 302 detects the state of charge SOC of the assembled battery 101 on the basis of the battery voltage V measured by the cell management circuit 103 or the voltage measurement circuit 104, the battery current I measured by the current measurement circuit 105, and the estimated result T3 for the internal temperature of the assembled battery 101 provided by the internal temperature estimation unit 301.

Moreover, on the basis of the battery voltage V and the battery current I, the internal resistance calculation unit 303 detects, by calculation, the internal resistance R of the assembled battery 101 in which the plurality of battery cells 101a, 101b, ... are connected in series. And the deterioration state calculation unit 304 obtains the state of health (SOH) of the assembled battery 101 on the basis of the estimated result T3 for the internal temperature of the assembled battery 101 provided by the internal temperature estimation unit 301, the state of charge (SOC) calculation result for the assembled battery 101 provided by the state of charge calculation unit 302, and the result of detection of the internal resistance of the assembled battery 101 provided by the internal resistance calculation unit 303. Moreover, the permitted current calculation unit 305 obtains the permitted currents for charging and discharging control of the assembled battery 101 (i.e. the maximum possible charging current and the maximum possible discharging current), using the estimated result T3 provided by the internal temperature estimation unit 301, the result of calculation SOC provided by the state of charge calculation unit 302, and the result of calculation SOH provided by the deterioration state calculation unit 304. Furthermore, the internal temperature diagnosis unit 306 diagnoses whether or not the estimated internal temperature result T3 provided by the internal temperature estimation unit 301 is reliable, using the estimated result T3 provided by the internal temperature estimation unit 301, the battery surface temperature T1 detected by the first temperature measurement unit 201, and the battery internal resistance R provided by the internal resistance calculation unit 303.

Figure 4:
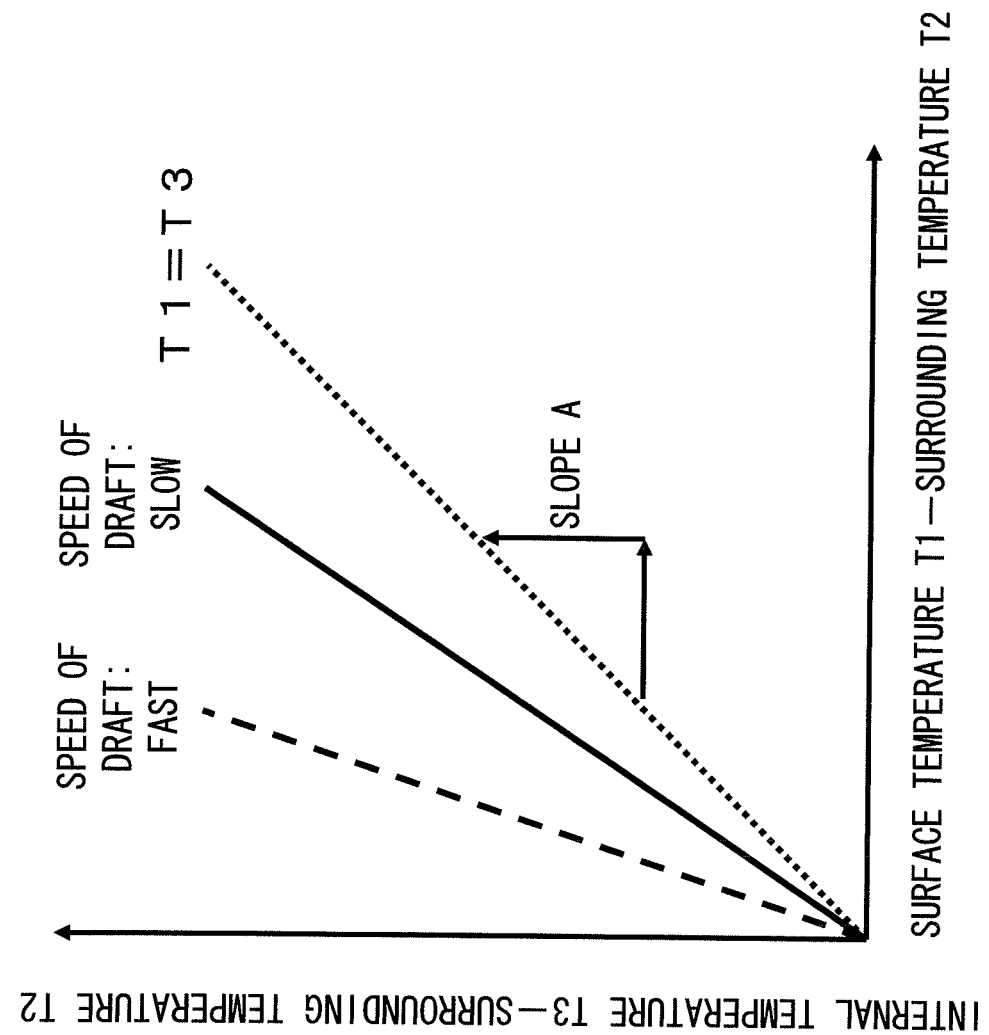
FIG. 4 is a figure showing the relationship between the surface temperature T1 of the battery, the temperature T2 of its surroundings, its internal temperature T3, and the speed of a cooling air draft.

First, the method by which the internal temperature estimation unit 301 estimates the internal temperature of the battery will be explained. FIG. 4 is a figure showing the relationship between the surface temperature T1 of the battery, the temperature T2 of its surroundings, its internal temperature T3, and the speed of the cooling draft. When the result obtained by the surface temperature T1 of the battery and the temperature T2 of its surroundings measured with the temperature sensors; the internal temperature T3 of the battery measured by embedding a temperature sensor in the interior of the battery so as not to exert any influence upon the characteristics of the battery; and furthermore, the speed of the cooling draft measured by the speed of draft sensor is plotted under the situation of changing the speed of the cooling draft with the difference between the battery internal temperature T3 and the temperature T2 of the battery surroundings being shown along the vertical axis and the difference between the battery surface temperature T1 and the temperature T2 of the battery surroundings being shown along the horizontal axis as shown in FIG. 4, the difference between these two temperatures have a linear relationship having some slope A at a constant speed of air draft. The slope A changes according to the speed of the cooling draft for the battery: when the speed of the cooling draft is low, the slope A is small (i.e. the difference between the surface temperature T1 of the battery and its internal temperature T3 is small); and when the speed of the cooling draft is high, the slope A is great (i.e. the difference between the surface temperature T1 of the battery and its internal temperature T3 is great).

Thus, in this embodiment, for this assembled battery 101 and this battery module 102, the slopes A is detected by actually measuring the surface temperatures T1, the surrounding temperatures T2, the internal temperatures T3, and the speeds W of the cooling draft, and a table giving the slope A with respect to the speed W of the cooling draft is stored in advance in the memory 106b. Or, it would also be acceptable to store the slope A in the memory 106b, in the format of a function of the speed W of the cooling draft. Using the relationship shown in FIG. 4, the internal temperature estimation unit 301 reverse calculates the internal temperature T3 of the assembled battery 101, in other words estimates its internal temperature T3, on the basis of the battery surface temperature T1 measured by the first temperature measurement units 201, the temperature T2 of the battery surroundings measured by the second temperature measurement unit 202, and the speed W of the cooling draft for the assembled battery 101 housed in the battery module 102. Accordingly to this method, it is possible to estimate the internal temperature T3 of the assembled battery 101 in an accurate manner, even without installing any temperature sensors in the interiors of the battery cells 101a, 101b, . . . .

The result T3 of the estimation of the internal temperature of the assembled battery 101 that has been performed by the internal temperature estimation unit 301 is used as input to various types of calculations performed by the battery control circuit 106. Since this estimated internal temperature result T3 is the true temperature of the battery cells 101a, 101b, . . . that make up the assembled battery 101, accordingly it is possible to detect the states of the assembled battery 101 and of the battery module 102 using this estimated internal temperature result T3 at higher accuracy, as compared to the case when the states of the assembled battery 101 and of the battery module 102 are detected using the battery surface temperature T1.

Next, an example of the processing performed by the state of charge calculation unit 302 for detecting the SOC will be explained. As described above, the state of charge calculation unit 302 detects the SOC on the basis of the battery voltage V measured by the cell management circuit 103 or by the voltage measurement circuit 104, the battery current I measured by the current measurement circuit 105, and the result T3 of the estimation of the internal temperature of the assembled battery 101 performed by the internal temperature estimation unit 301.

Figure 5:
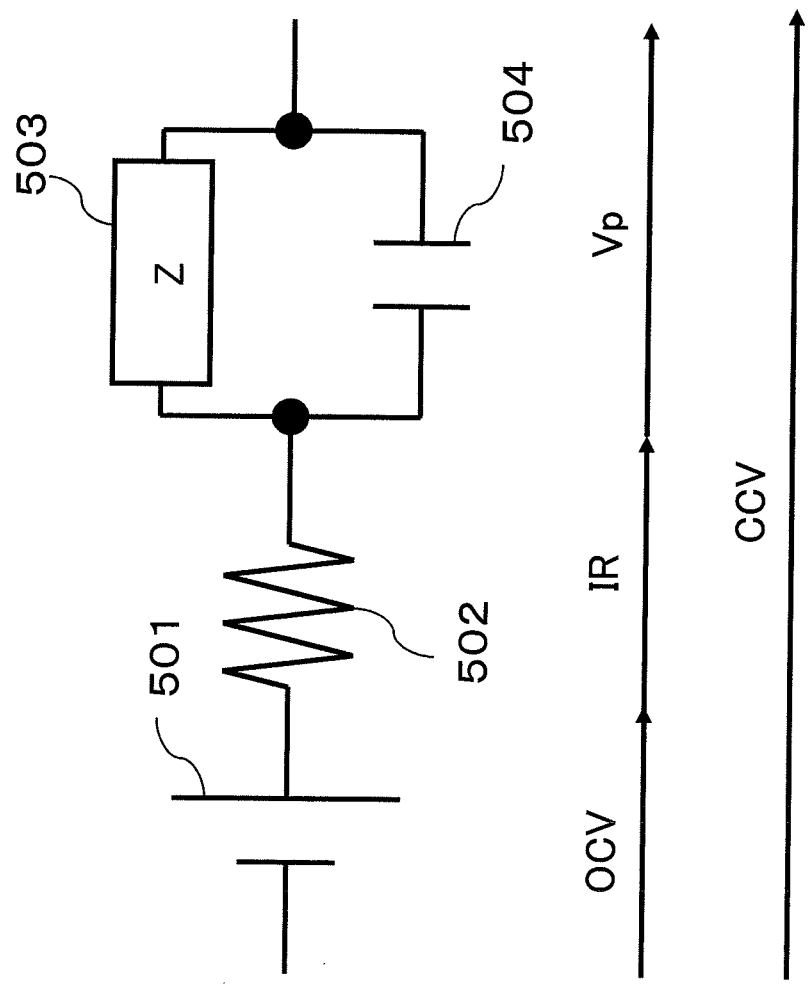
FIG. 5 is a figure showing an equivalent circuit for the assembled battery 101.

FIG. 5 shows an equivalent circuit for the assembled battery 101. As described above, in this embodiment, the assembled battery 101 in which the plurality of battery cells 101a, 101b, . . . are connected in series or in parallel or in series-parallel is treated as being a single cell. In FIG. 5, the reference symbol 501 denotes the electromotive force OCV (Open Circuit Voltage) of the assembled battery 101, 502 denotes the internal resistance R of the assembled battery 101, 503 denotes the impedance Z of the assembled battery 101, and 504 denotes the capacitance C of the assembled battery 101. The assembled battery 101 may be described as an assembly in which a circuit in which the impedance 503 and the capacitance 504 are connected in parallel, the internal resistance 502, and the electromotive force 501 are connected in series. The voltage CCV (Closed Circuit Voltage) between the terminals of the assembled battery 101 when a battery current I flows in the assembled battery 101 is given by the following Equation:

$$CCV = OCV + I \cdot R + Vp \quad (1)$$

In the equation (1), Vp is the polarization voltage and corresponds to the voltage of the circuit in which the impedance Z and the capacitance C are connected in parallel.

Although the electromotive force OCV is used in the calculation of the state of charge SOC, it is not possible directly to measure the electromotive force OCV in a situation in which the assembled battery 101 is being charged and discharged. Because of this, the electromotive force OCV is obtained by calculation, i.e. by subtracting the drop IR due to the internal resistance R and the polarization voltage Vp from the voltage CCV between the battery terminals, as per the following Equation:

$$OCV = CCV - I \cdot R - Vp \quad (2)$$

The internal resistance R and the polarization voltage Vp are characteristic information obtained from the assembled battery 101 and are ascertained experimentally by charging and discharging the assembled battery 101, and are stored in advance in the memory 106b that is incorporated in the battery control circuit 106. It should be understood that, if values for the internal resistance R and the polarization voltage Vp corresponding to the state of charge of the assembled battery 101 and its temperature and current and so on are formatted as a table and stored, and if the values that correspond to the state of charge of the assembled battery 101 and its temperature and current and so on are read out and used in the calculation of Equation (2) described above, then it is possible to calculate the electromotive force OCV with high accuracy. The voltage CCV between the battery terminals is the result of measurement by the voltage measurement circuit 104, while the current I is the result of measurement by the current measurement circuit 105.

Figure 6:
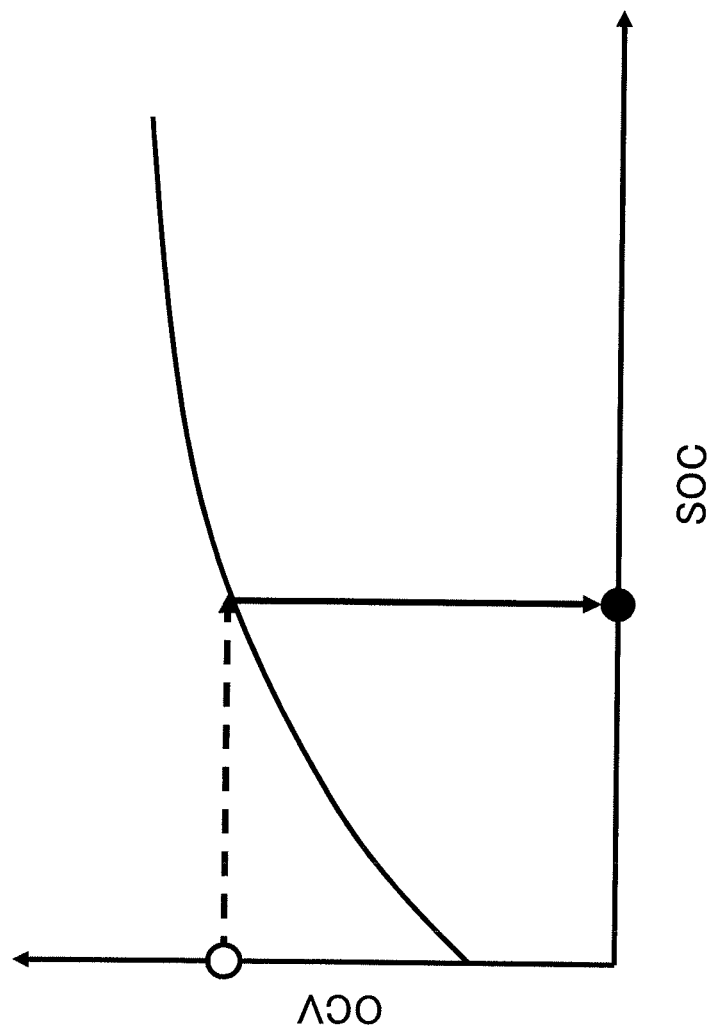
FIG. 6 is a figure showing characteristic data for the electromotive force OCV of the assembled battery 101 with respect to its state of charge SOC.

FIG. 6 is a figure showing the characteristic of the electromotive force OCV of the assembled battery 101 with respect to its state of charge SOC. The characteristic data for the electromotive force OCV with respect to the state of charge SOC of the assembled battery 101 are measured in advance, and are stored in the memory 106*b* of the battery control circuit 106. After the electromotive force OCV has been calculated according to Equation (2) by using the voltage CCV between the battery terminals, the current I, the internal resistance R, and the polarization voltage Vp, then the state of charge SOC corresponding to the electromotive force OCV that is the result of calculation from the characteristic data of FIG. 6 is searched, and the state of charge SOC that is the result of this search is taken as being the estimated value thereof.

In the calculation for estimating the state of charge SOC performed by the state of charge calculation unit 302, it is also possible for the estimation calculation for the state of charge to be performed by a different method from the one described above. If the initial state of charge before charging or discharging the assembled battery 101 is termed SOC0, and the capacity of the assembled battery 101 when it is fully charged is termed Qmax, then the state of charge SOCi may be calculated according to the following Equation:

$$SOCi = SOC0 + 100 \cdot \int I dt / Qmax \quad (3)$$

In Equation (3), the current I is the value that is measured by the current measurement circuit 105. Moreover, Qmax is a value that has been ascertained experimentally by charging and discharging the assembled battery 101, and that has been stored in advance in the memory 106*b* of the battery control circuit 106. In this first embodiment, it would be acceptable to obtain the state of charge SOC by either of these methods, i.e. either by performing the calculation to estimate the state of charge SOC according to Equation (2) described above, or by performing the calculation to estimate the state of charge SOC according to Equation (3) described above. Furthermore, it would also be acceptable to arrange to calculate the state of charge SOC by some method other than those of Equation (2) and Equation (3); and it would also be acceptable to arrange to provide a SOC detector that detects the state of charge SOC, so as to detect the state of charge SOC directly.

Figure 7:
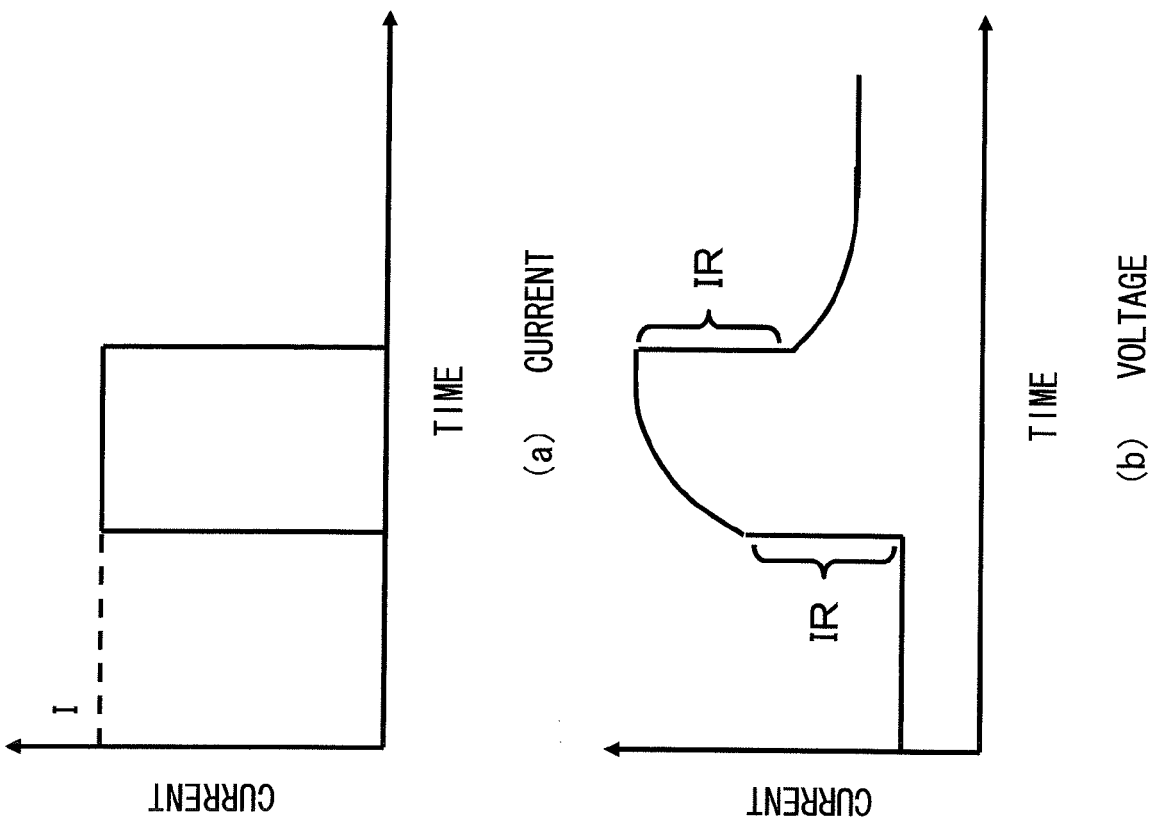
FIG. 7 is a figure for explanation of processing for calculation of internal resistance R by an internal resistance calculation unit 303.

FIG. 7 is a figure for explanation of the processing for calculation of the internal resistance R by the internal resistance calculation unit 303. The internal resistance calculation unit 303 detects the internal resistance R of the assembled battery 101 by calculation, on the basis of the battery voltage V and the battery current I. When charging or discharging is performed by flowing a current I in pulse form to the assembled battery 101, then the voltage rises or drops by just the product (I·R) of the internal resistance possessed by the assembled battery 101 and the current I. Thus, the internal resistance calculation unit 303 calculates the internal resistance R according to the following Equation:

$$R = (V1 - V0)/(I1 - I0) \quad (4)$$

In Equation (4), V1 denotes the present charging voltage or discharging voltage, V0 denotes the charging voltage or discharging voltage before one sampling, I1 denotes the present charging current or discharging current, and I0 denotes the charging current or discharging current before one sampling.

The internal resistance R that has been detected is transmitted to the deterioration state calculation unit 304 and to the internal temperature diagnosis unit 306.

It should be understood that while this embodiment shows a method in which the internal resistance R is detected by a calculation that considers the assembled battery 101 as a single cell, the method of this embodiment is not to be considered as being limitative; it would also be acceptable to arrange to detect the internal resistance by handling each of the battery cells 101*a*, 101*b*, ... as an individual unit cell. For example, it would be acceptable to arrange for the internal resistance r1, r2, ... of each of the battery cells 101*a*, 101*b*, ... to be detected by the cell management circuit 103 on the basis of its individual voltage and current, and for the sum total of these internal resistances to be taken as being the internal resistance R of the assembled battery 101.

The deterioration state calculation unit 304 obtains the state of health SOH of the assembled battery 101 on the basis of the result T3 of estimating the internal temperature of the assembled battery 101 provided by the internal temperature estimation unit 301, the result of calculating the state of charge SOC provided by the state of charge calculation unit 302, and the result of detection of the internal resistance R of the assembled battery 101 provided by the internal resistance calculation unit 303. In concrete terms, a characteristic value R0 of the initial internal resistance of the assembled battery 101 that corresponds to the result of estimating the internal temperature T3 of the assembled battery 101 provided by the internal temperature estimation unit 301 and the result of calculating the state of charge SOC provided by the state of charge calculation unit 302 is calculated by table lookup, i.e. by being extracted in advance from a characteristic table, as shown in Equation (5). Moreover, the state of health (SOH) is calculated according to Equation (6) described below as the proportional increase of the internal resistance from its initial state, using this initial internal resistance characteristic value R0 and the present internal resistance R calculated by the internal resistance calculation unit 303.

$$R0 = \text{Map}(T3, SOC) \quad (5)$$

$$SOH = 100 \cdot R/R0 \quad (6)$$

Figure 8:
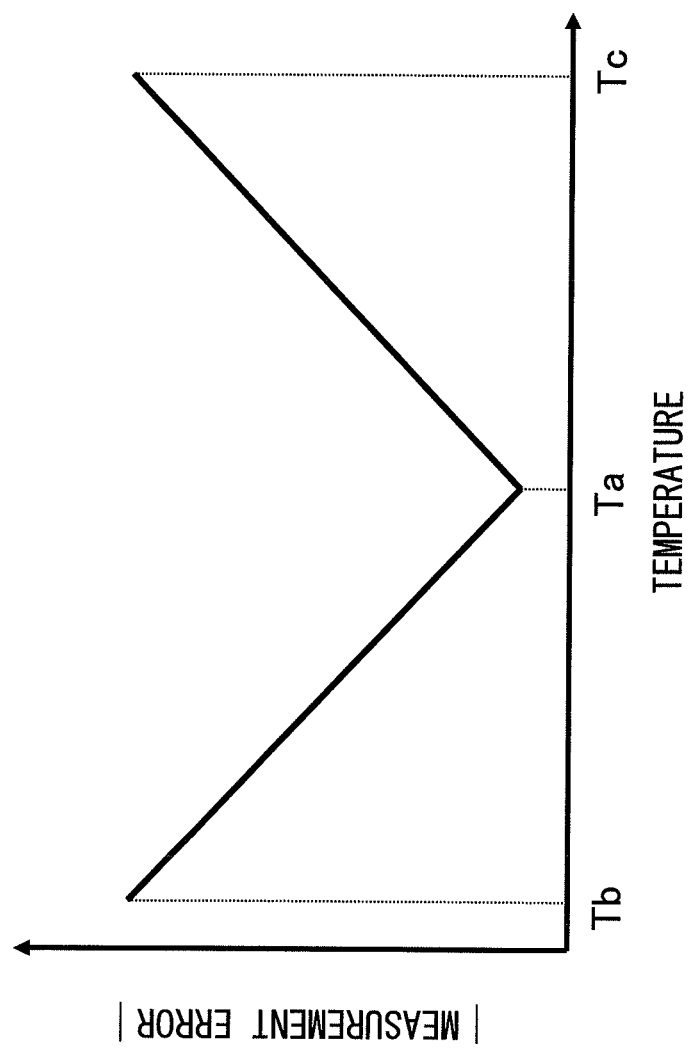
FIG. 8 is a figure showing measurement error of a voltage measurement circuit 104 and a current measurement circuit 105, corresponding to the temperature.

If there is a temperature characteristic as shown in FIG. 8 in the detection accuracy of the voltage measurement circuit 104 and the current measurement circuit 105, then, it would also be acceptable to arrange to decide whether or not it is possible to perform the calculation of the state of health (SOH) according to a condition in which the temperature is used in consideration of the fact that the error in detection increases as the temperature becomes further removed from some central temperature Ta. In other words, the temperature of the surroundings in which the voltage measurement circuit 104 or the current measurement circuit 105 is placed is the output of the second temperature sensor T2, and it would be possible to stop the operation of the deterioration state calculation unit 304 if the output T2 is different from and more than a threshold value determined in advance on comparing the output T2 with the center temperature.

The permitted current calculation unit 305 obtains the permitted currents for charging and discharging control of the assembled battery 101 (i.e. the maximum currents at which the assembled battery 101 can be charged and discharged) using the result T3 of internal temperature estimation provided by the internal temperature estimation unit 301, the result of state of charge (SOC) calculation provided by the state of charge calculation unit 302, and the result of state of health (SOH) calculation provided by the deterioration state calculation unit 304. Generally, if the state of charge of the assembled battery 101 is high, then the current at which it can be discharged is great, but the current at which it can be charged is small. Conversely thereto, if the state of charge of the assembled battery 101 is low, then the current at which it can be discharged is small, but the current at which it can be charged is great. The permitted currents that can be charged and discharged resulting from this calculation are transmitted to a controller that is installed externally (in this first embodiment, to the vehicle control circuit 109 shown in FIG. 1) along with the state of charge (SOC) from the state of charge calculation unit 302 and the state of health (SOH) from the deterioration state calculation unit 304, and the external controller performs charging and discharging of the assembled battery 101 within the ranges defined by these currents that can be inputted and outputted that have thus been received. Here, the current at which the assembled battery 101 can be charged will be termed the permitted charging current Icmax, while the current at which it can be discharged will be termed the permitted discharging current Idmax.

Before calculating this permitted charging current Icmax and permitted discharging current Idmax, the present electromotive force OCV of the assembled battery 110 is obtained using the result of the state of charge (SOC) calculation provided by the state of charge calculation unit 302, as in Equation (7). It should be understood that, if the state of charge calculation unit 302 performs the calculation of the state of charge SOC according to Equation (2) described above, then it would be possible to apply the electromotive force OCV obtained according to Equation (2) just as it is.

$$OCV = \text{Map}(SOC) \tag{7}$$

Figure 9:
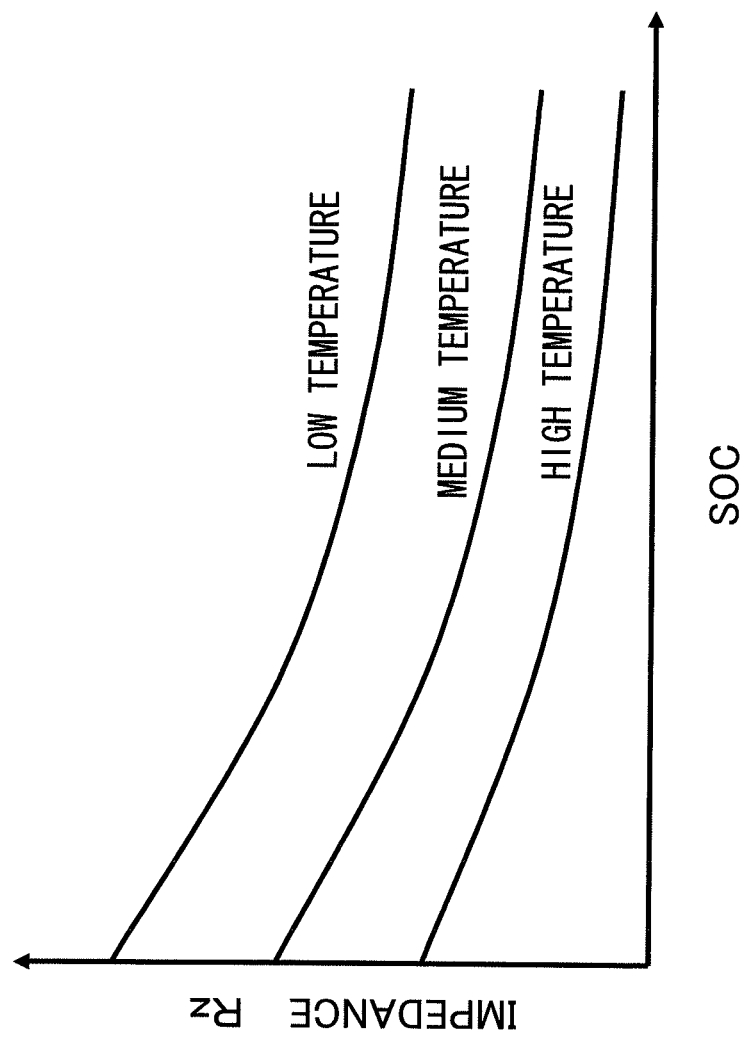
FIG. 9 is a figure showing the characteristic of the equivalent impedance Rz of the assembled battery 101 with respect to its SOC and its temperature.

Moreover since, with the assembled battery 101 shown in FIG. 5, the values of its internal resistance R, its impedance Z, and its equivalent impedance Rz of change according to the state of charge SOC and the temperature as shown in FIG. 9, and also according to its state of health (SOH) and so on, accordingly here the equivalent impedance Rz is stored in the memory 106b of the battery control circuit 106 in the form of a map. The permitted current calculation unit 305 obtains the present equivalent impedance Rz of the assembled battery 101 on the basis of the estimated temperature T3 provided by the internal temperature estimation unit 301, the state of charge (SOC) provided by the state of charge calculation unit 302, and the state of health (SOH) provided by the deterioration state calculation unit 304 (refer to Equation (8)). It should be understood that it would also be acceptable to map the characteristic of the equivalent impedance Rz according to the current while charging or while discharging or the like, in addition to the internal temperature T3, the state of charge SOC, and the state of health SOH.

$$Rz = \text{Map}(T3, SOC, SOH) \tag{8}$$

By using the above described electromotive force OCV and equivalent impedance Rz, the permitted charging current Icmax and the permitted discharging current Idmax are calculated according to the following Equation:

$$Icmax = (Vmax - OCV)/Rz \tag{9}$$

$$Idmax = (OCV - Vmin)/Rz \tag{10}$$

Figure 10:
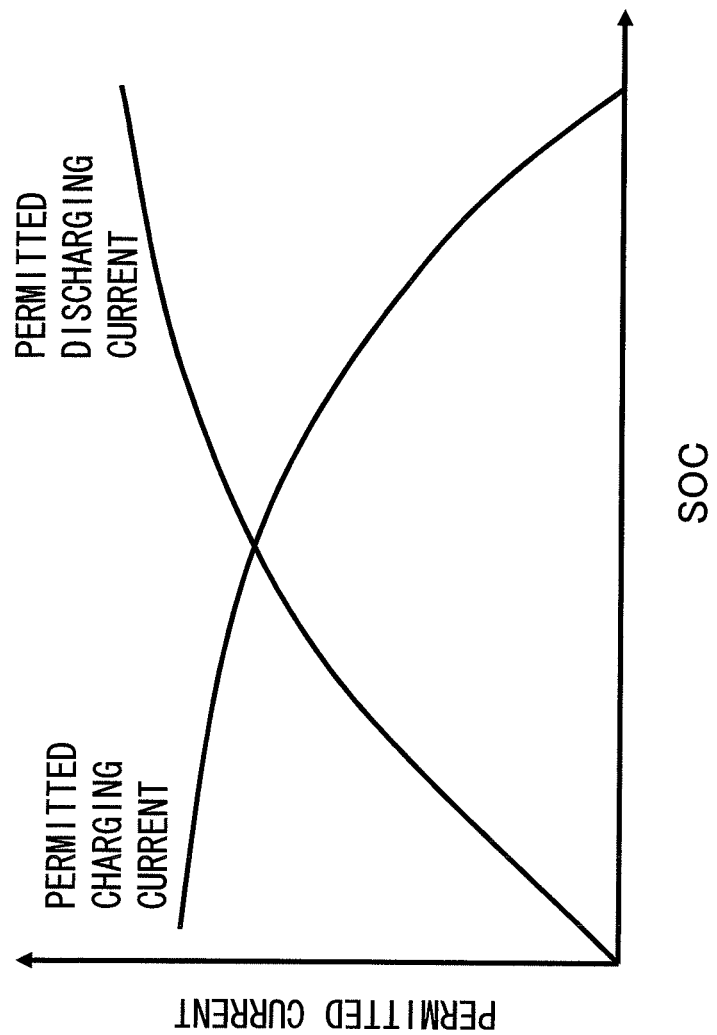
FIG. 10 is a figure showing the permitted charging and discharging currents of the assembled battery 101 with respect to its SOC.

In Equations (9) and (10), Vmax denotes the upper limit voltage of the assembled battery 101, Vmin denotes the lower limit voltage of the assembled battery 101, OCV denotes the present electromotive force of the assembled battery 101, and Rz denotes the present equivalent impedance of the assembled battery 101. A conceptual figure for the permitted currents obtained with Equation (9) and Equation (10) is shown in FIG. 10. Here, the permitted charging power Pcmax is obtained by multiplying by the voltage Vchg during the permitted charging current, and the permitted discharging power Pdmax is obtained by multiplying by the voltage Vdis during the permitted discharging current.

$$Pcmax = Vchg \cdot Icmax \tag{11}$$

$$Pdmax = Vdis \cdot Idmax \tag{12}$$

In the processing described above performed by the permitted current calculation unit 305, it would be acceptable to perform the calculation based upon the voltage and the impedance of each of the battery cells 101a, 101b, ... individually, and to convert them finally into the permitted currents and the permitted powers for the assembled battery 101; or, alternatively, it would also be acceptable to perform the calculation on the basis of the voltage and the impedance of the assembled battery 101 from the start. The result of the calculation is transmitted to the controller that is installed externally (in this first embodiment, to the vehicle control circuit 109 shown in FIG. 1), and the vehicle control circuit 109 performs charging and discharging of the battery module 102 within the ranges defined by the permitted currents or the permitted powers that it has received.

Next, the details of the processing performed by the internal temperature diagnosis unit 306 will be explained. As described above, this internal temperature diagnosis unit 306 performs diagnosis of the result T3 of estimation of the internal temperature provided by the internal temperature estimation unit 301, using the result T3 of estimation of the internal temperature provided by the internal temperature estimation unit 301, the battery surface temperature T1 provided by the first temperature measurement unit 201, and the result R of detection of the internal resistance provided by the internal resistance calculation unit 303.

Figure 11:
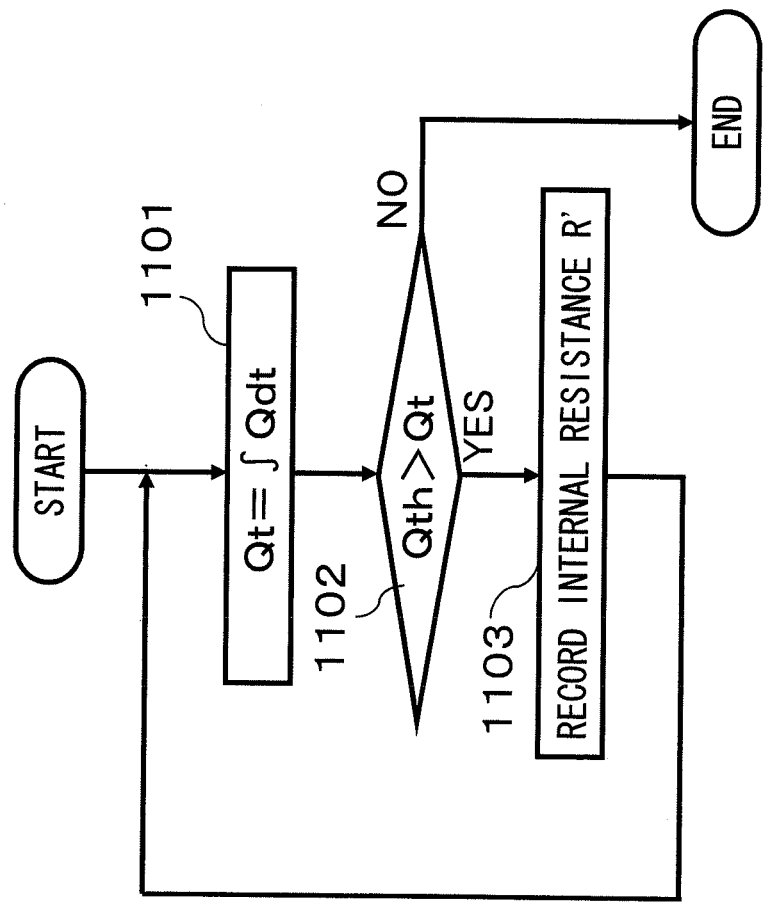
FIG. 11 is a flow chart showing processing to record the battery internal resistance R' under the condition that the battery surface temperature T1 is equal to the battery internal temperature T3.

The internal temperature diagnosis unit 306 records in the memory 106b of the battery control circuit 106 the internal resistance R' of the assembled battery 101, as calculated by the internal resistance calculation unit 303 under the condition that the surface temperature T1 of the assembled battery 101 is considered as being equal to its internal temperature T3, this condition representing the situation directly after various devices that use the assembled battery 101 have been started or the like (hereinafter this will be referred to simply as "under the condition that T1=T3") (here, this internal resistance under the condition that T1=T3 will be termed R'). FIG. 11 shows this processing to record the battery internal resistance R' under the condition that the battery surface temperature T1 is equal to the battery internal temperature T3. In a step 1101, if it has been decided that the condition that the battery surface temperature T1 is equal to the battery internal temperature T3 is satisfied, then the internal temperature diagnosis unit 306 calculates an amount of heat Q on the basis of the result of calculation of the electromotive force OCV from the time point directly after devices of various types that use the assembled battery 101 have started, the battery voltage V measured by the voltage measurement circuit 104, and the battery current I measured by the battery measurement circuit 105.

$$Q = I \cdot (V - OCV) \tag{13}$$

The rise in the temperature of the assembled battery 101 is then estimated by integrating this amount of heat Q over time:

$$Qt = \int Q \, dt \tag{14}$$

In the next step 1102, a decision is made as to whether or not the integrated value Qt of the amount of heat is smaller than some threshold value Qth. If the integrated value Qt of the amount of heat is smaller than the threshold value Qth, then it is decided that the condition that the battery surface temperature T1 is equal to the battery internal temperature T3 is still being satisfied, and the flow of control proceeds to a step 1103, in which the recording of the internal resistance R' calculated by the internal resistance calculation unit 303 continues. On the other hand, if the integrated value Qt of the amount of heat is greater than or equal to the threshold value Qth, then it is decided that the condition that the battery surface temperature T1 is equal to the battery internal temperature T3 is no longer being satisfied, and the processing for recording of the internal resistance R' is terminated. It should be understood that, while the internal resistance R' is being recorded under the condition that the battery surface temperature T1 is equal to the battery internal temperature T3, the SOC calculated by the state of charge calculation unit 302 and the battery surface temperature T1 measured by the first temperature measurement unit 201 are also recorded in correspondence therewith at the same moments that the internal resistance R' is calculated by the resistance calculation unit 303. At this time, if a plurality of internal resistances R' are detected that correspond to SOCs that are substantially the same values and battery surface temperatures T1 that are substantially the same values, then, it is possible to employ a stable internal resistance R' by recording the average value of those internal resistances R'. It should be understood that the threshold value Qth is the standard value for making the decision as to whether or not the system is in the state of the battery surface temperature T1 being equal to the battery internal temperature T3, and is set to an appropriate value for considering that T1≈T3 even though after the use of the battery has started the internal temperature T3 has risen.

As the method for making the decision as to whether or not the system is in the state of the battery surface temperature T1 being equal to the battery internal temperature T3, the battery surface temperature T1 from the first temperature measurement unit 201 and the temperature T2 of the battery surroundings from the second temperature measurement unit 202 may be compared together directly after the battery control circuit 106 has started, and, if the difference between these two temperatures is within the range of a threshold value that is determined in advance, then it may be determined that the system is in the state of T1 being equal to T3 and recording of the internal resistance R' may be started. Or alternatively, the temperature of the motor-generator 108 (the method by which this is measured and so on are not shown in the drawings) and the temperature T2 of the battery surroundings from the second temperature measurement unit 201 may be compared together, and, if the difference between these two temperatures is within the range of a threshold value that is determined in advance, then it may be decided that the system is in the state of T1 being equal to T3 and recording of the internal resistance R' may be started. Furthermore, if the assembled battery 101 is used in an automobile that is equipped with an internal combustion engine that has a drive system in which power for starting this engine is supplied by the assembled battery 101, then it would also acceptable to arrange to obtain the internal resistance R' from the changes of the battery current I and of the battery voltage V during engine starting.

Figure 12:
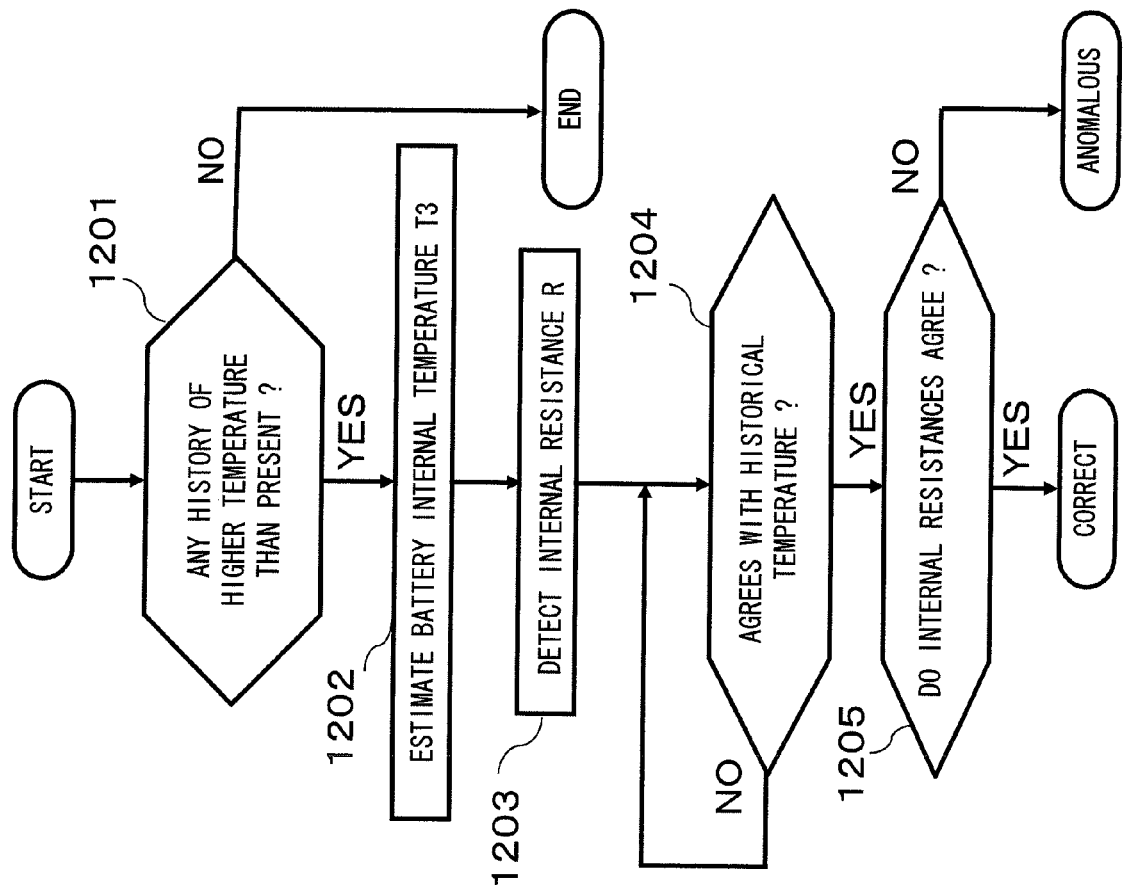
FIG. 12 is a flow chart showing operation performed by an internal temperature diagnosis unit 306 for diagnosis of the result T3 of estimating the internal temperature.

FIG. 12 is a flow chart showing the operation of diagnosis of the estimated internal temperature result T3 performed by the internal temperature diagnosis unit 306. The internal temperature diagnosis operation in this first embodiment will now be explained with reference to this flow chart. After devices of various types for which the assembled battery 101 is used have been started, and after the battery control circuit 106 has been started along therewith, in a step 1201 the internal temperature diagnosis unit 306 examines the battery surface temperatures T1 (=T3) corresponding to the internal resistances R' that have been recorded under the condition that the battery surface temperature T1 is equal to the battery internal temperature T3, and checks whether or not there is any history of a higher temperature than the present surface temperature T1 of the assembled battery 101 as measured by the first temperature measurement unit 201. If there is any history of a higher temperature than the present battery surface temperature T1, then the flow of control proceeds to a step 1202 and the diagnosis operation starts, while if there is no such history then the diagnosis operation terminates.

In the step 1202 after the operation of diagnosis of the internal temperature starts, the internal temperature T3 of the assembled battery 101 estimated by the internal temperature estimation unit 301 is inputted. Next, in a step 1203, the internal resistance R of the assembled battery 101 calculated by the internal resistance calculation unit 303 is inputted. Here, the internal resistance that has thus been acquired by the internal temperature diagnosis operation is denoted by R, and this should be carefully distinguished from the internal resistances R' that were acquired under the condition that T1=T3. Then in a step 1204 a search is made as to whether or not, among the battery surface temperatures T1 (=T3) recorded in correspondence with the internal resistances R' under the condition that T1=T3, there is some temperature that agrees with the internal temperature T3 that was estimated by the internal temperature estimation unit 301 in the step 1202, and, if there is some historical surface temperature T1 (=T3) that agrees with this estimated internal temperature T3, then the flow of control proceeds to a step 1205.

In this step 1205, this internal resistance R' corresponding to the historical surface temperature T1 (=T3) that agrees with the estimated internal temperature T3 is read out from the memory 106*b*, and is compared with the internal resistance R that was detected in the step 1203. The internal resistance R and the internal resistance R' at the same battery internal temperature T3 should in principle have the same value. If the internal resistance R and the internal resistance R' agree with one another, in other words if the difference between these two resistances is within some predetermined value, then it is decided that it is possible to be confident that the battery internal temperature T3 that was estimated in the step 1202 is correct; while, if the internal resistance R and the internal resistance R' do not agree with one another, in other words if the difference between these two resistances is greater than the predetermined value, then it is decided that it is not possible to be confident in the battery internal temperature T3 that was estimated, and that it is anomalous.

Figure 13:
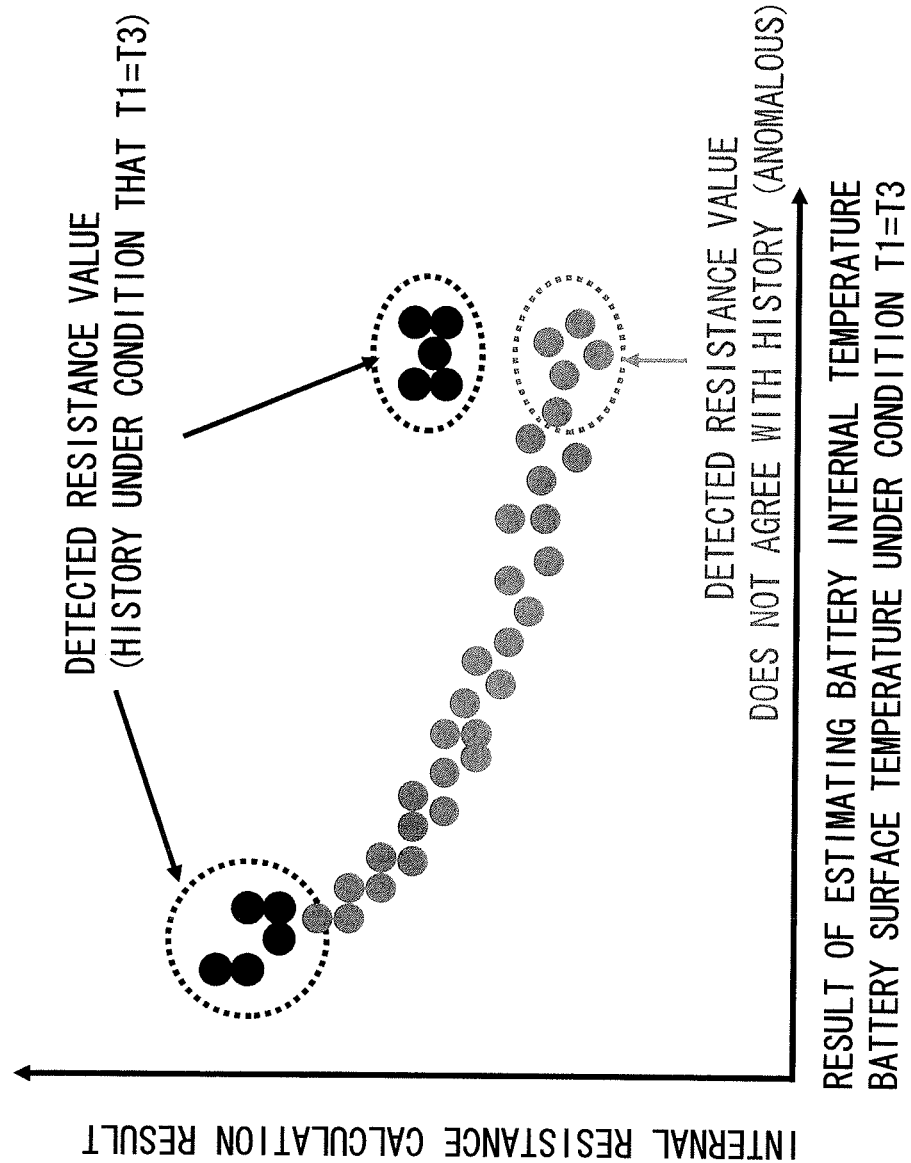
FIG. 13 is a figure for explanation of this method of assessing the result T3 of estimation of the internal temperature, performed by the internal temperature diagnosis unit 306.

FIG. 13 shows the result of diagnosis of the estimated internal temperature result T3 by the internal temperature diagnosis unit 306. In FIG. 13, the result T3 of estimating the battery internal temperature and the battery surface temperature T1 under the condition that T1=T3 are shown along the horizontal axis, while the result R or R' of detecting the internal resistance is shown along the vertical axis. The black circles in the figure are marks that plot the battery surface temperatures T1 (equal to the battery internal temperatures T3) detected along with the internal resistances R' during the execution of the internal resistance recording processing shown in FIG. 11, under the condition of the battery surface temperature T1 being equal to the battery internal temperature T3. Moreover, the gray circles in the figure are marks that plot the internal resistance R detected when the estimated internal temperature T3 was detected during the execution of the diagnosis processing shown in FIG. 12. When it becomes equal to the battery surface temperature (equal to the battery internal temperature T3) recorded under the condition that T1=T3 after the estimated internal temperature T3 of the assembled battery 101 gradually rises during execution of the diagnosis processing, then the present internal resistance R is compared with the internal resistance R' that is recorded. The internal resistance of the battery becomes greater along with progression of deterioration of the battery. The internal resistances R' are past history information, while on the other hand, since the internal resistance R is new and current information, this present internal resistance R must either be the same as some past historical internal resistance R, or larger than them. Irrespective of this, as shown in FIG. 13, if the present internal resistance R (the gray circles) is smaller than the past internal resistance R' (the black circle) in the state that the estimated internal temperature T3 detected when the present internal resistance R was detected and a surface temperature T1 (=T3) detected when a past internal resistance R' was detected agree with one another, then it is determined that the estimated result T3 for the internal temperature is not correct (i.e. that it is anomalous).

Figure 14:
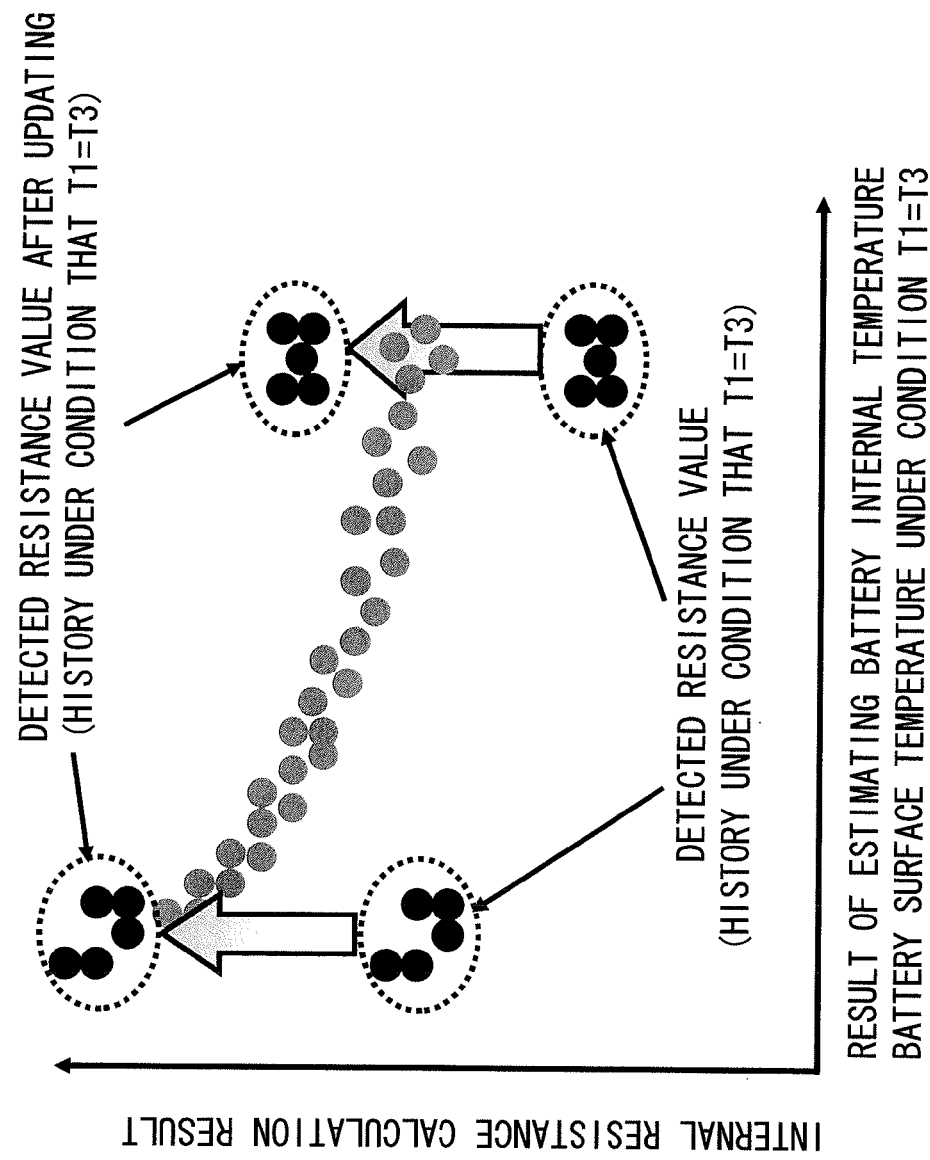
FIG. 14 is a figure for explanation of a method of updating historical internal resistance data.

As described above, the internal resistance of the battery becomes greater along with progression of deterioration of the battery. Accordingly, it is necessary to update the history data for the internal resistances R' stored in the memory 106b of the battery control circuit 106, in other words to update the history data for the battery surface temperatures T1 (equal to the battery internal temperature T3) detected along with the internal resistances R' under the condition of the battery surface temperature T1 being equal to the battery internal temperature T3. The method for updating the internal resistance history data will now be explained with reference to FIG. 14. In FIG. 14, the result T3 of estimating the battery internal temperature and the battery surface temperature T1 under the condition that T1=T3 are shown along the horizontal axis, while the result R or R' of detection of the internal resistance is shown along the vertical axis.

The internal temperature diagnosis unit 306 checks that the condition of the battery surface temperature T1 being equal to the battery internal temperature T3 is satisfied, and moreover that some higher temperature than the present battery surface temperature T1 is stored among the history data for the battery surface temperature T1 (=T3) and the internal resistance R1 in the memory 106b, and then starts the diagnosis operation. After the diagnosis has started, if the internal resistance R" that has been detected under the condition that the battery surface temperature T1 is equal to the battery internal temperature T3, in other words under the condition that the integrated value Qt of the amount of heat is smaller than the threshold value Qth, is clearly larger as compared with the past historical internal resistances R', then the internal temperature diagnosis unit 306 determines that the assembled battery 101 has deteriorated. At this time, if some historical internal resistance R' is stored for which the conditions during detection such as SOC and temperature and so on are close, then this historical internal resistance R' and the currently detected internal resistance R" are compared together, and the increase ratio of the internal resistance is calculated. And, by multiplying the historical internal resistance R' recorded under the condition that the temperature was high by the increase ratio described above, history data for the internal resistance R' with respect to the battery surface temperature T1 (=T3) at the present state of health (SOH) of the assembled battery 101 is generated. In other words, the history data is updated.

It should be understood that it would be acceptable to arrange to apply the increase ratio for low temperature just as it is to the historical internal resistance R' at high temperature; or, if the internal resistance increase ratio varies according to temperature, then, by applying a temperature dependent characteristic for the internal resistance increase ratio that has been determined in advance by experiment, the historical value of the internal resistance at high temperature may be updated by using an internal resistance increase ratio in which this temperature dependence characteristic is taken into account.

If the battery temperature is elevated along with charging or discharging of the assembled battery 101, and the estimated internal temperature value T3 and a historical surface temperature T1 (=T3) on the higher temperature agree with one another, then the detected internal resistance value R and the historical internal resistance R' after updating are compared together. If the detected internal resistance value R is lower than the historical internal resistance R' after updating by at least a threshold value that is determined in advance, then the internal temperature diagnosis unit 306 decides that the estimated internal temperature value T3 is anomalous, and that it cannot be relied upon. In this manner, it is possible to assess the result T3 of estimating the internal temperature correctly, even if there is some change in the characteristics of the battery 101 due to deterioration thereof, such as when the assembled battery 101 has been neglected for a long period or the like. It should be understood that while FIG. 14 shows an example in which it is decided that the result T3 of estimating the internal temperature is anomalous if an internal resistance R has been detected that is lower than the historical internal resistance R' after updating, it would also be acceptable to arrange for an anomaly to be decided upon even if an internal resistance R has been detected that is higher than the historical internal resistance R' after updating.

As has been explained above, by using the history of internal resistances R' that have been detected in the past, it becomes possible to perform more accurate diagnosis of the result T3 of estimating the internal temperature of the assembled battery 101. Due to this, it is possible to detect in a more accurate manner various types of states of the assembled battery 101 on the basis of a result T3 of internal temperature estimation whose reliability is high, and accordingly it is possible to enhance the reliability of devices of various types that use the assembled battery 101 as a power supply.

Embodiment #2

In the first embodiment described above, an example has been shown in which it is assessed whether or not the result T3 of estimation of the internal temperature is a value that can be reliable by deciding according to one of various methods whether or not a state holds in which the battery internal temperature T3 and the battery surface temperature T1 are in agreement with one another, by calculating the internal resistance R1 of the battery if it has been decided that they agree, by recording this internal resistance R' in correspondence with the battery surface temperature T1, and by building historical data for the internal resistance R'; but now a second embodiment will be explained in which it is arranged to build up the history data for the internal resistance R' by a different method.

In this second embodiment, the assembled battery 101 or the battery module 102 is put into a constant temperature chamber and is stored there for a long time period so as to make the battery surface temperature T1 and the battery internal temperature T3 agree with one another, and then a charging and discharging test is performed. By changing the set temperature of the constant temperature chamber a plurality of times and then a data table is built up of the internal resistance R1 under the condition for the battery surface temperature T1 and the battery internal temperature T3 that T1=T3 by performing such a charging and discharging test. And the reliability of the result T3 of estimating the internal temperature is assessed using this data table. As the data table for the internal resistance R', it would also be acceptable to create a data table according to the temperature (T1=T3), the SOC, the current or the like by varying a parameter such as the temperature or the SOC or the current or the like, and the data table is used as the internal resistance in the internal temperature diagnosis unit 306, the state of charge calculation unit 302 or the state of health (SOC) calculation unit 304 or the like. When referring to this type of data table for the internal resistance R', it is possible to obtain a characteristic curve for the internal resistance R' as it changes at least according to temperature. It should be understood that it would also be acceptable to arrange to make the data table for the internal resistance R' into a function, and to store this function for use. The data table for the internal resistance R', or the data resulting from making this table into a function, is stored in advance in the memory 106b of the battery control circuit 106.

Figure 15:
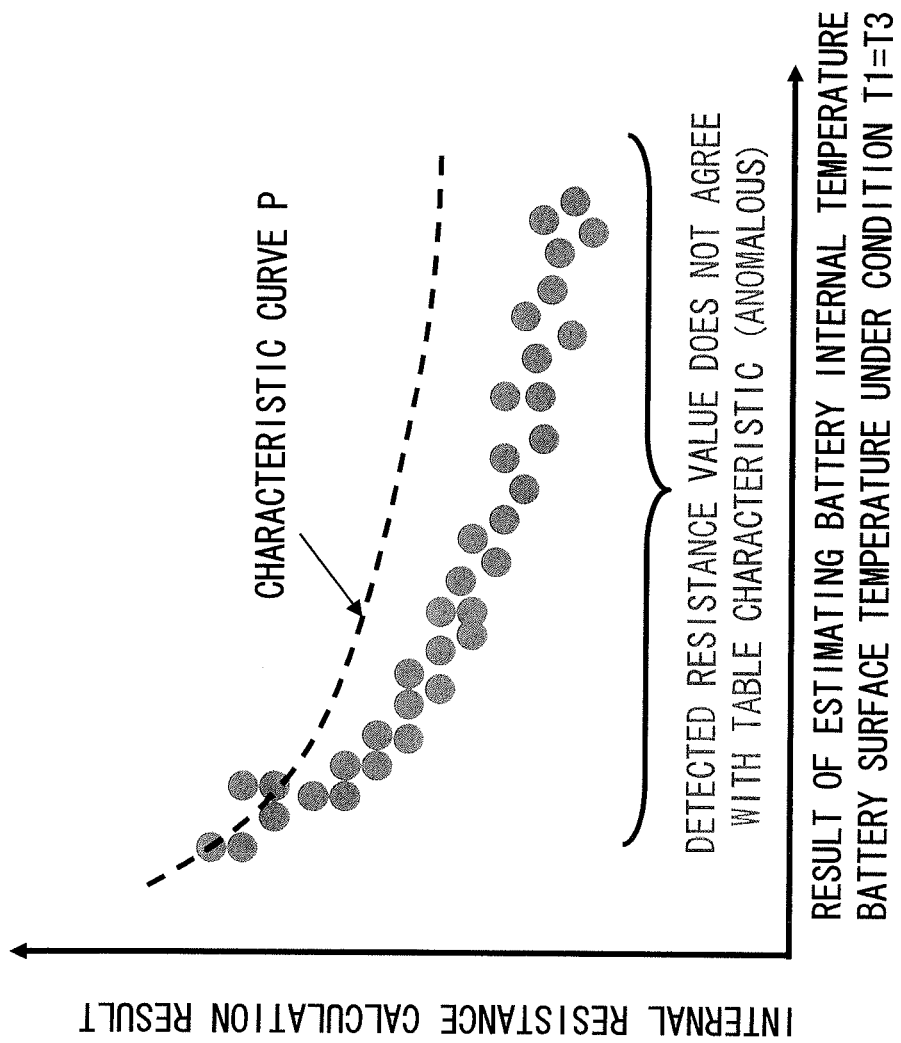
FIG. 15 is a figure for explanation of a method of assessing the result T3 of estimation of the internal temperature, performed by the internal temperature diagnosis unit 306.

In this second embodiment, the internal temperature diagnosis unit 306 acquires both the result T3 of estimation of the internal temperature from the internal temperature estimation unit 301 and also the result of detection of the internal resistance R from the internal resistance calculation unit 303, and moreover searches for the internal resistance R' for the estimated internal temperature T3 and the same surface temperature T1 (=T3) from the data table for the internal resistance R' that is stored, and diagnoses whether or not the result T3 of estimating the internal temperature is a reliable value by comparing them together. FIG. 15 is a figure for explanation of the method for diagnosis of the result T3 of estimation of the internal temperature in this second embodiment, and in this figure the result T3 of estimation of the battery internal temperature and the battery surface temperature T1 under the condition that T1=T3 are shown along the horizontal axis, while the result R or R' of detection of the internal resistance is shown along the vertical axis. As shown in FIG. 15, if the tendencies of change of the characteristic curve P of the internal resistance R' shown by the broken line and of the present internal resistance R with respect to the result T3 of estimating the internal temperature (shown by the gray circles in the figure) agree with one another (i.e. if the difference between these resistance values is within some predetermined value), then it is decided that the result T3 of estimating the internal temperature is reliable, and that this is the correct value. But if the difference between the internal resistance R' and the internal resistance R at the same temperature is greater than or equal to the predetermined value, then it is decided that the result T3 of estimation of the internal temperature is not reliable, and that it is an anomalous value. It should be understood that, if the data table for the internal resistance R' that is stored is the initial characteristic thereof, then the present internal resistance R must be a resistance value that has become greater along with deterioration of the assembled battery 101. Accordingly, if the present internal resistance R is smaller than the internal resistance R' that is stored, then clearly the result T3 of estimation of the internal temperature is anomalous, and it is possible to decide that it cannot be relied upon.

Figure 16:
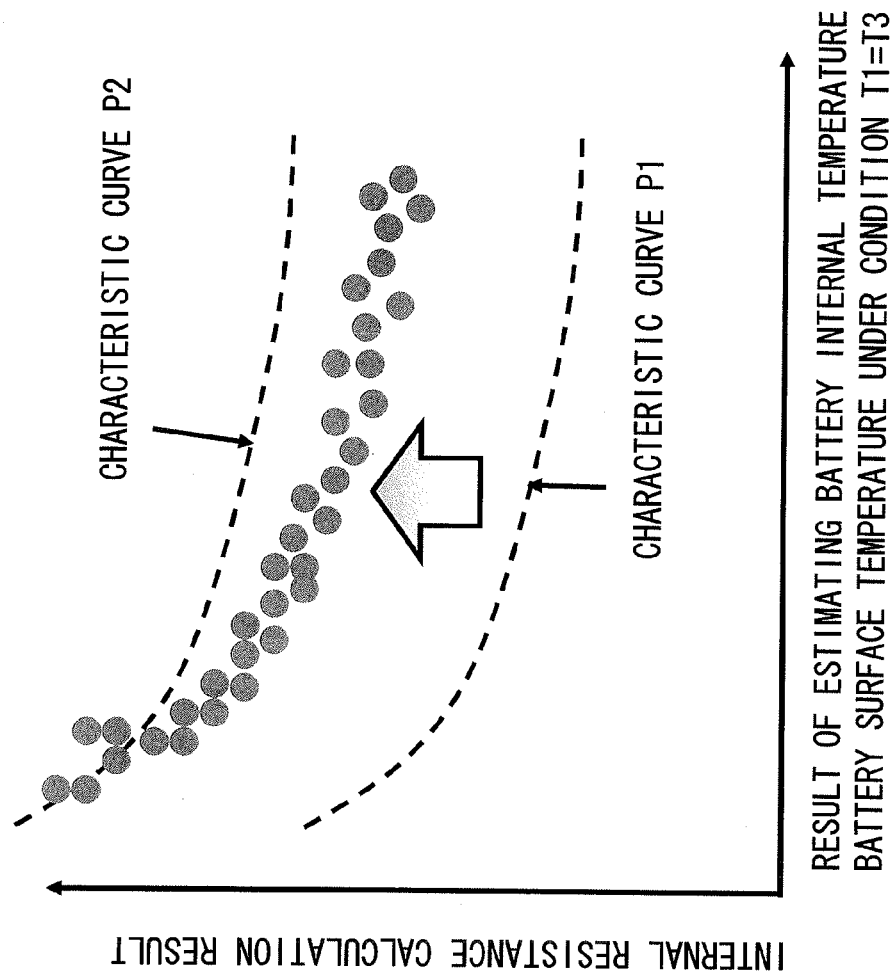
FIG. 16 is a figure for explanation of a method of updating a data table of internal resistances R'.

Now, it is necessary to update the data table for the resistances R', since the internal resistance of the assembled battery 101 increases as the battery deteriorates. A method for updating the data table for the resistances R' will now be explained with reference to FIG. 16. In FIG. 16, the result T3 of estimating the battery internal temperature and the battery surface temperature under the condition that T1=T3 are shown along the horizontal axis, and the result R or R' of detecting the internal resistance is shown along the vertical axis. Furthermore, the characteristic curve P1 is the characteristic curve of the internal resistance R' before updating. After various types of device that are supplied by the assembled battery 101 are started and along therewith the battery control circuit 106 has been started, from the state in which the surface temperature T1 of the assembled battery 101 is equal to its internal temperature T3 while the integrated value Qt of the amount of heat Q is smaller than the threshold value Qth, the internal resistance R' is detected by calculation by the resistance calculation unit 303 according to the method shown in FIG. 7. And the internal resistance R' before updating that was calculated under the same conditions of SOC and temperature as the condition in which the internal resistance R' was detected is searched from the data table in which the internal resistance R' before updating are stored in advance, and the internal resistance increase ratio is calculated from this value before updating. It should be understood that this processing is almost the same as the processing performed by the deterioration state calculation unit 304.

The internal resistance increase ratio that has been calculated is also multiplied into the internal resistances R' before updating that correspond to other temperatures, and thereby a data table of the internal resistances R' corrected for increase of the internal resistance due to deterioration of the assembled battery 101 is generated, so that the data table for the internal resistance R' is updated. In FIG. 16, the characteristic curve for the internal resistance R' with respect to the battery temperature (T1=T3) under the condition that the battery surface temperature T1 is equal to the battery internal temperature T3 is updated from the characteristic curve P1 before updating to the present characteristic curve P2. It should be understood that if the increase ratio of the internal resistance R' exhibits some temperature characteristic or the like, then it is desirable to ascertain this temperature characteristic by experiment in advance, and to take this into consideration in making the internal resistance R' reflect the internal resistance increase ratio in various situations. If the result of estimation by the internal temperature estimation unit 301 is correct, then the tendency of change of the detected value of the internal resistance R corresponding to the estimated internal temperature T3 should agree with the characteristic curve P2 of the newest internal resistance data table after updating.

The internal temperature diagnosis unit 306 calculates the estimated internal temperature T3 and the internal resistance R and acquires their tendencies of change, and makes a decision as to the reliability of the estimated internal temperature T3 by comparing them with the updated newest characteristic curve P2. In concrete terms, it searches for a historical internal resistance R' corresponding to the estimated internal temperature T3 from the updated new data table of the historical internal resistance R', and compares this internal resistance R' with the internal resistance R that is the result of detection performed by the internal resistance calculation unit 303. And, if the difference between this internal resistance R and the historical internal resistance R' is greater than or equal to some threshold value that is determined in advance, or if it is small, then it is decided that the estimated internal temperature T3 is anomalous and that it cannot be relied upon.

It should be understood that, while this diagnosis of the result T3 of estimating the internal temperature is performed by comparing together the internal resistance R for the current result T3 of estimation of the internal resistance and an internal resistance R' for a surface temperature T1 (equal to the internal temperature T3) that was recorded in the past, it would be also possible further to enhance the reliability of the result of diagnosis by adding the state of charge SOC or the current or the like to the conditions, and by deciding upon an anomaly if the internal resistances are different irrespective of the conditions such as the temperature, the SOC, the current and so on in agreement.

Embodiment #3

Figure 17:
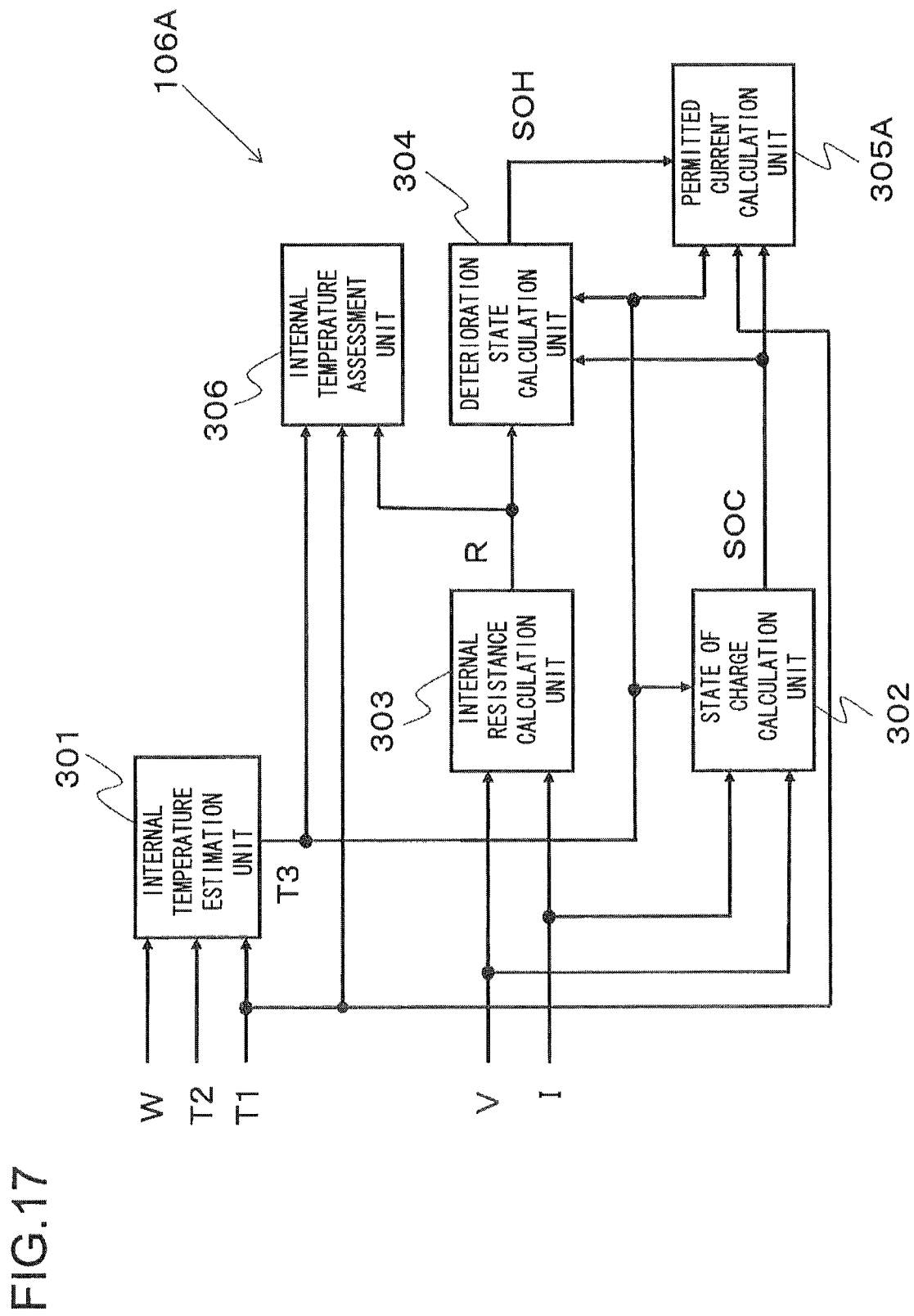
FIG. 17 is a block diagram showing the details of processing performed by a battery control circuit 106A of a third embodiment.

A third embodiment will now be explained in which if it has been decided that it is an anomalous value that cannot be relied upon as the result of diagnosis of the result T3 of estimating the internal temperature, then it is arranged to limit the permitted currents that are calculated by the permitted current calculation unit 305. FIG. 17 is a block diagram showing the details of processing performed by a battery control circuit 106A of this third embodiment. In this third embodiment, the diagnosis processing is performed by this battery control circuit 106A that employs a permitted current calculation unit 305A instead of the permitted current calculation unit 305 of the first and second embodiments.

If it has been decided by the internal temperature diagnosis unit 306 that the result T3 of estimating the internal temperature is anomalous, then the permitted current calculation unit 305A obtains the present equivalent impedance Rz of the assembled battery 101 from a map on the basis of the battery surface temperature T1 provided by the first temperature measurement unit 201 (in the first embodiment, the result T3 of estimation of the internal temperature from the internal temperature estimation unit 301 was used), the state of charge SOC provided by the state of charge calculation unit 302, and the state of health (SOH) provided by the deterioration state calculation unit 304 (refer to Equation (15); in the first embodiment, the equivalent impedance Rz was obtained from Equation (8)). It should be understood that it would also be acceptable to arrange to obtain the equivalent impedance Rz by mapping characteristics not only according to the surface temperature T1, the state of charge SOC, and the state of health SOH, but in addition according to the currents during charging and during discharging, or the like.

$$Rz = \mathrm{Map}(T1, SOC, SOH) \quad (15)$$

Using this equivalent impedance Rz and the above described electromotive force OCV, the permitted charging current Icmax and the permitted discharging current Idmax are calculated according to Equations (9) and (10) described above.

Figure 18:
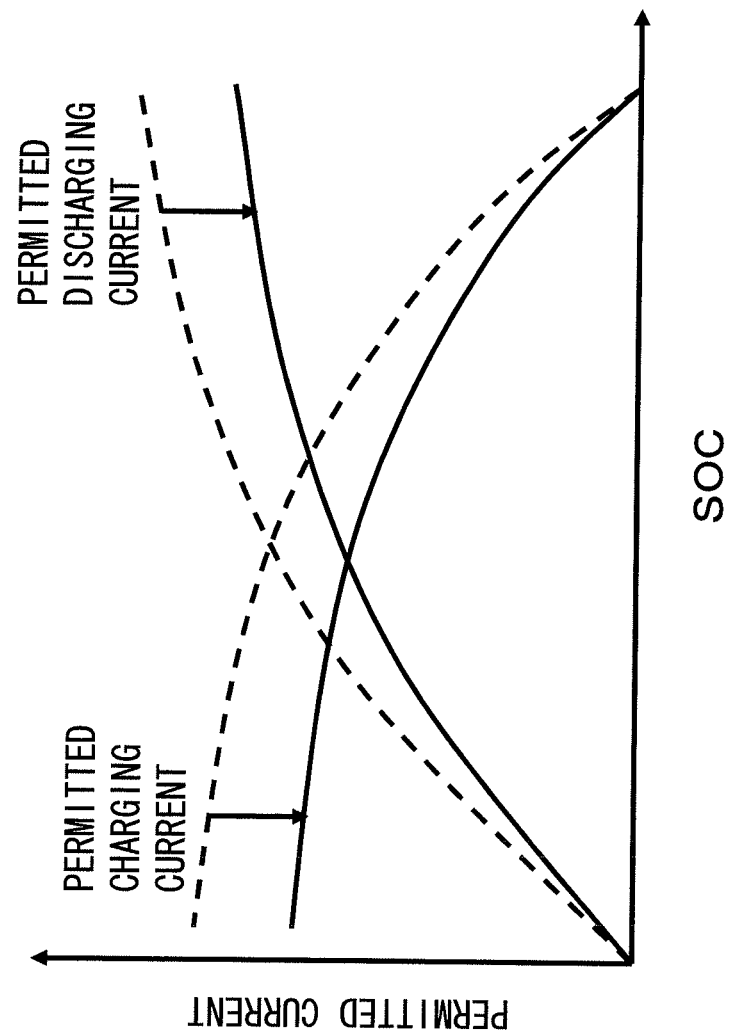
FIG. 18 is a figure showing permitted charging and discharging currents that have been limited.

In this manner, if the result of diagnosis of the estimated internal temperature T3 is anomalous, then the permitted current calculation unit 305A calculates the permitted currents Icmax and Idmax using the battery surface temperature T1, instead of the battery internal temperature T3. Since generally the surface temperature of the assembled battery 101 is lower than its internal temperature, accordingly the equivalent impedance Rz obtained according to Equation (15) becomes large (refer to FIG. 9), and as a result the permitted charging current Icmax and the permitted discharging current Idmax obtained according to Equations (9) and (10) become small, so that the permitted charging and discharging currents Icmax and Idmax are limited to smaller values than their values during conditions of correctness (refer to FIG. 18) if it has been assessed that the result T3 of estimating the internal temperature is anomalous. It should be understood that the permitted charging power Pcmax and the permitted discharging power Pdmax obtained according to Equations (11) and (12) described above also are limited, and become small.

According to this third embodiment, even if the result T3 of diagnosis of the estimated internal temperature T3 is anomalous, it is still possible to perform charging and discharging control for the assembled battery 101 in security. It should be understood that, as another method for performing the calculation of the permitted currents by the permitted current calculation unit 305A if it has been decided by the internal temperature diagnosis unit that an anomaly has occurred, it would also be acceptable simply to arrange for the permitted charging current Icmax and the permitted current Idmax that are the results of calculation in the first and second embodiments to be reduced to ½ or to ⅓. Or it would also be acceptable to arrange to limit the permitted currents smaller, down to values that correspond to a performance determined upon for the working life of the assembled battery 101.

Figure 19:
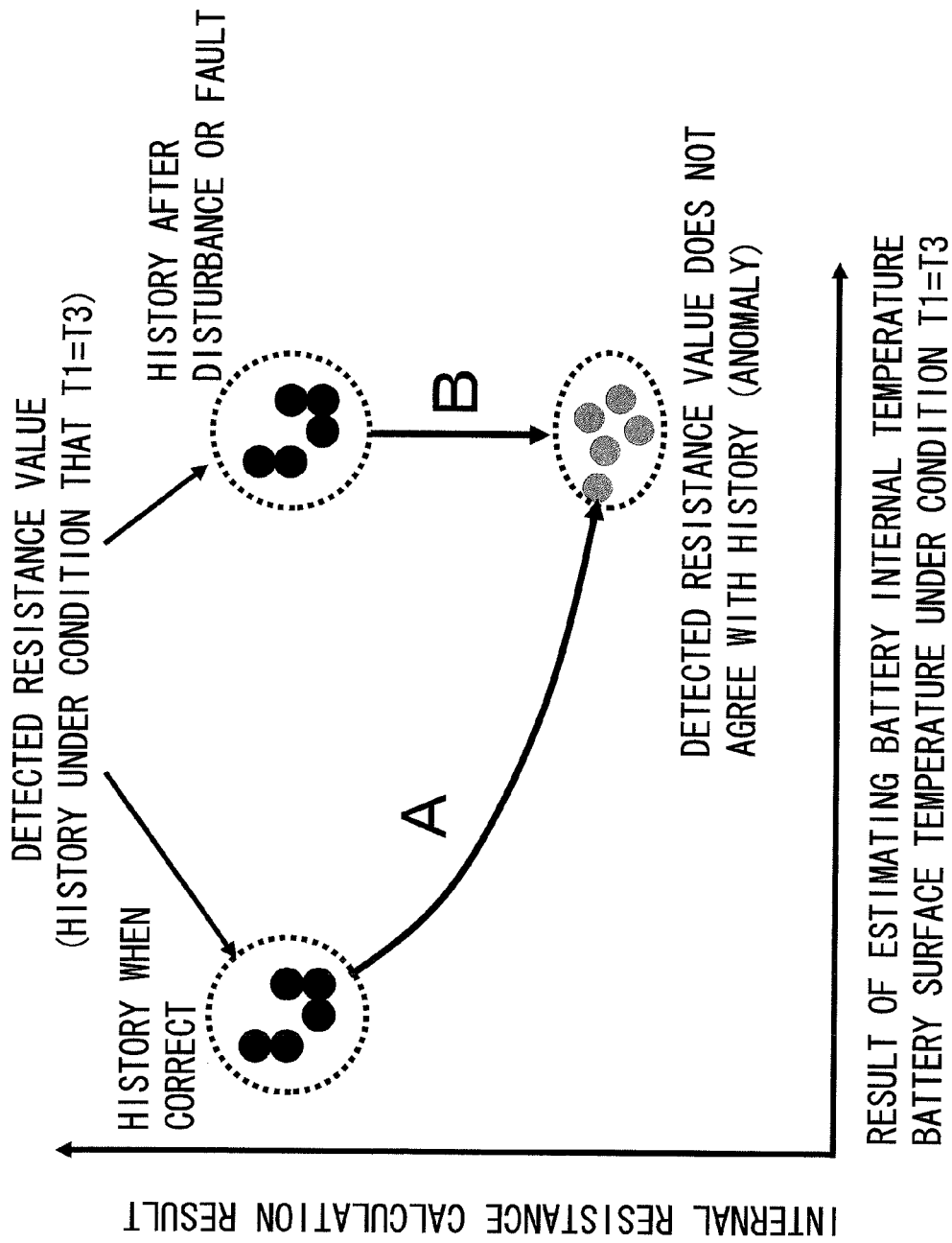
FIG. 19 is a figure for explanation of a method of assessing the result T3 of estimation of the internal temperature performed by the internal temperature diagnosis unit 306, when the temperature measurement unit 201 or 202 of the battery has suffered a disturbance or has suffered a fault.

Now the operation, in this third embodiment, will be explained if some disturbance affects the first temperature measurement unit 201 and the second temperature measurement unit 202 shown in FIG. 2, or if faults occur with both of the temperature measurement units 201 and 202. If a disturbance affects the first temperature measurement unit 201 and the second temperature measurement unit 202 so that they recognize temperatures that are higher than the true temperatures, or if faults have occurred in which they mistakenly recognize high temperatures, then the internal temperature diagnosis unit 306 decides mistakenly that the assembled battery 101 is being operated in a high temperature environment. When the history during conditions of correctness before the disturbance affects both of the temperature measurement units 201 and 202 or the faults occur, and the history after the disturbance affects them or the faults occur, are matched together and plotted, then the result of detection of the internal resistance R under the condition that the battery surface temperature T1 is equal to the battery internal temperature T3 is given by the black circles in FIG. 19. In FIG. 19, the result T3 of estimating the battery internal temperature and the battery surface temperature T1 under the condition that T1=T3 are shown along the horizontal axis, while the result R or R' of detecting the internal resistance is shown along the vertical axis. In the history during conditions of correctness, the internal temperature T3 appears on the low side, whereas on the other hand, in the history after a fault, the internal temperature T3 appears on the high side. However, since in either case there is no difference in the true internal temperature T3 of the assembled battery 101, accordingly, as shown in FIG. 19, the result of detection of the internal resistance R by the internal resistance calculation unit 303 will assume the same value.

The internal temperature diagnosis unit 306 decides that the fact that the result R of detection of the internal resistance by the internal resistance calculation unit 303 has a constant value with respect to the result T3 of estimation of the internal temperature by the internal temperature estimation unit 301 is the true situation. Subsequently, if both of the temperature measurement units 201 and 202 return to the correct state, then, when the assembled battery is charged and discharged, the internal resistance R changes along the path shown by A in FIG. 19 along with elevation of the battery internal temperature T3, and assumes a value shown by a gray circle. In other words, as shown in FIG. 9, the internal resistance R decreases when the battery internal temperature rises. However, the internal resistance R shown by a gray circle in FIG. 19 does not agree with the internal resistance R at the same internal temperature T3 in the past (in the group at the right side shown in FIG. 19 by the black circles), and accordingly the internal temperature diagnosis unit 306 comes to decide that the result T3 of estimation of the internal temperature is anomalous.

On the other hand, if both of the temperature measurement units 201 and 202 remain in the anomalous state due to the disturbance or the fault, then it continues to be erroneously recognized that the assembled battery 101 is being operated in a high temperature environment (i.e. the value of the temperature is constant), so that the internal resistance R decreases since the true temperature of the assembled battery 101 is elevated along with charging and discharging, and as a result the internal resistance R changes along the path B in FIG. 19. Since in this case as well this is not compatible with the past historical result, accordingly the internal temperature diagnosis unit 306 diagnoses that there is an anomaly in the result T3 of estimation of the internal temperature. Since in either case, according to this third embodiment, the permitted current is limited to a low value according to this detection of an anomaly in the result T3 of estimation of the internal temperature, accordingly the input and output currents to the assembled battery 101, or its input and output powers, come to be limited, even if both of the temperature measurement units 201 and 202 have experienced a disturbance, or if a fault has occurred.

Next, since it is possible to exchange the assembled battery 101 and the battery module 102, there is a possibility that ones having different characteristics may be mounted in exchange. A case will now be explained in which it is supposed that, with this third embodiment, an assembled battery 101 having different characteristics has been mounted as a replacement. At this time, information is stored in the memory 106b of the battery control circuit 106 about characteristics of various types related to the assembled battery 101 and the battery module 102 before the changeover. The data table described above in the second embodiment for the battery internal resistance R' measured under the condition that the battery surface temperature T1 is equal to the battery internal temperature T3, and so on, is included in this characteristic information. Since this characteristic information is different from the characteristic information for the assembled battery 101 and the battery module 102 after the changeover, there is a fear of decrease in the accuracy of detection by the battery control circuit 106 of various types of state of the assembled battery 101 and the battery module 102 after the changeover. It is desirable for the charging and discharging of the assembled battery 101 to be limited under conditions of this type.

When the permitted current limitation function of the third embodiment is added to the second embodiment described above, using the data table for the internal resistance R' of the assembled battery 101 (or the function for the internal resistance R') that is stored in the memory 106b before the changeover, the internal temperature diagnosis unit 306 conducts diagnosis of the tendency of change of the internal resistance R with respect to the result T3 of estimation of the internal temperature of the assembled battery 101 after the changeover that has a different characteristic. If the assembled battery 101 has been changed over for one that has a different characteristic, then the tendency of change of the internal resistance R with respect to the result T3 of estimation of the internal temperature of the assembled battery 101 obtained during charging and discharging of the assembled battery 101 will be different from the tendency of change of the internal resistance R' with respect to the battery surface temperature T1 (=T3) in the data table for the internal resistance R' that is stored.

Figure 20:
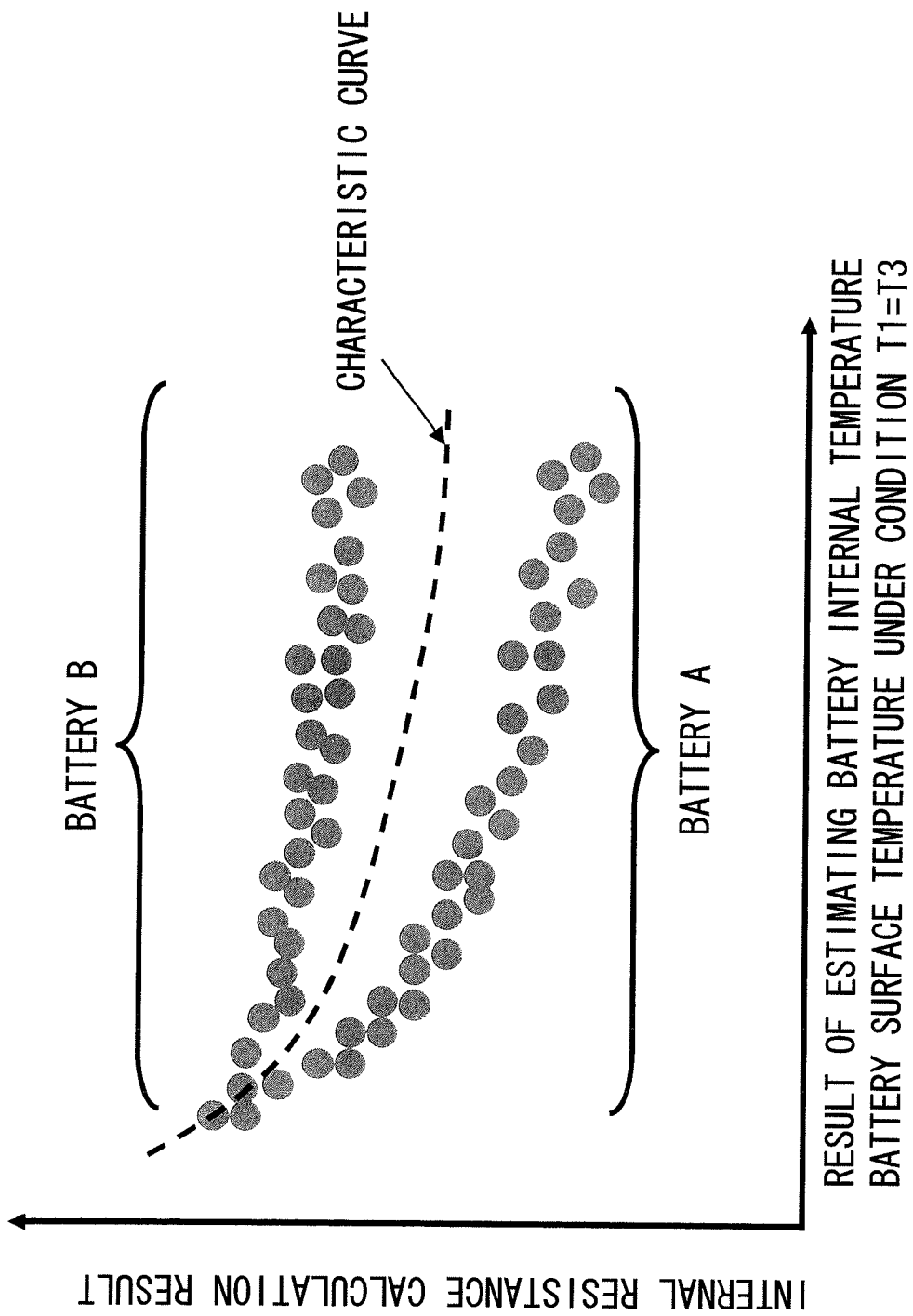
FIG. 20 is a figure showing, for a battery A and a battery B that have different characteristics, their tendencies of change of internal resistance with respect to the result of estimation of internal temperature.

FIG. 20 shows the tendencies of change of internal resistance with respect to the results of estimation of the internal temperatures of a battery A and a battery B that have different characteristics. In FIG. 20, the result T3 of estimating the battery internal temperature and the battery surface temperature T1 under the condition that T1=T3 are shown along the horizontal axis, while the result R or R' of detecting the internal resistance is shown along the vertical axis. Moreover, the characteristic curve in the figure is a characteristic curve for the internal resistance of the battery with respect to the result of estimating the internal temperature extracted from the data table for the internal resistance of the battery before the changeover, which is stored in the memory 106b. To compare the battery A after the changeover with the battery characteristic stored in the memory 106b, its change of internal resistance is large with respect to change of its internal temperature. On the other hand, for the battery B after the changeover, its change of internal resistance is small with respect to change of its internal temperature. Moreover, upon comparison with the battery characteristic stored in the memory 106b, for the battery A after the changeover, the difference between its battery surface temperature and its internal temperature is large, whereas, for the battery B after the changeover, the difference between its battery surface temperature and its internal temperature is small. In either case, when changeover is made to the other battery A or the other battery B having a different characteristic from the characteristic battery information that is stored in the memory 106b of the battery control circuit 106b, the internal temperature diagnosis unit 306 decides that the result of estimation of its internal temperature is anomalous. And since, at this time, the permitted current calculation unit 305A of this third embodiment limits the permitted current to a low value according to this detection of an anomaly, accordingly, it is possible to limit the input and output of the assembled battery 101 even if it is supposed that changeover is performed to a different assembled battery 101 or to a different battery module 102.

Embodiment #4

Figure 21:
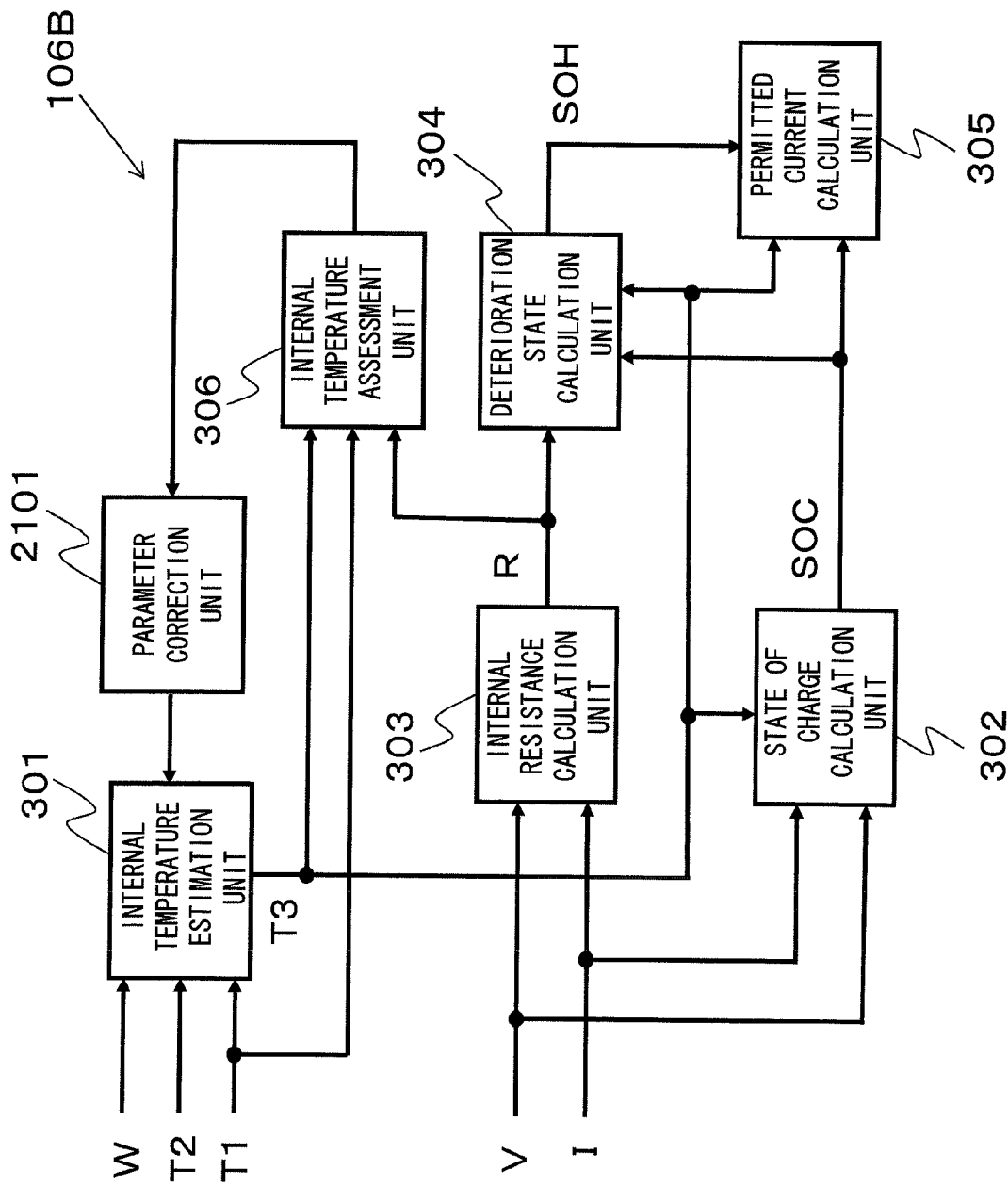
FIG. 21 is a block diagram showing the details of processing performed by a battery control circuit 106B of a fourth embodiment.

A fourth embodiment will now be explained in which it is arranged for an estimated internal temperature result that is reliable to be obtained by correcting the parameters used for internal temperature estimation if it has been decided that the result T3 of estimating the internal temperature is not reliable and an anomaly is present. FIG. 21 is a block diagram showing the details of processing performed by a battery control circuit 106B of this fourth embodiment. In this fourth embodiment, the diagnosis processing is performed by this battery control circuit 106B, in which a parameter correction unit 2101 has been added to the battery control circuit 106 of the first and second embodiments shown in FIG. 3.

Figure 22:
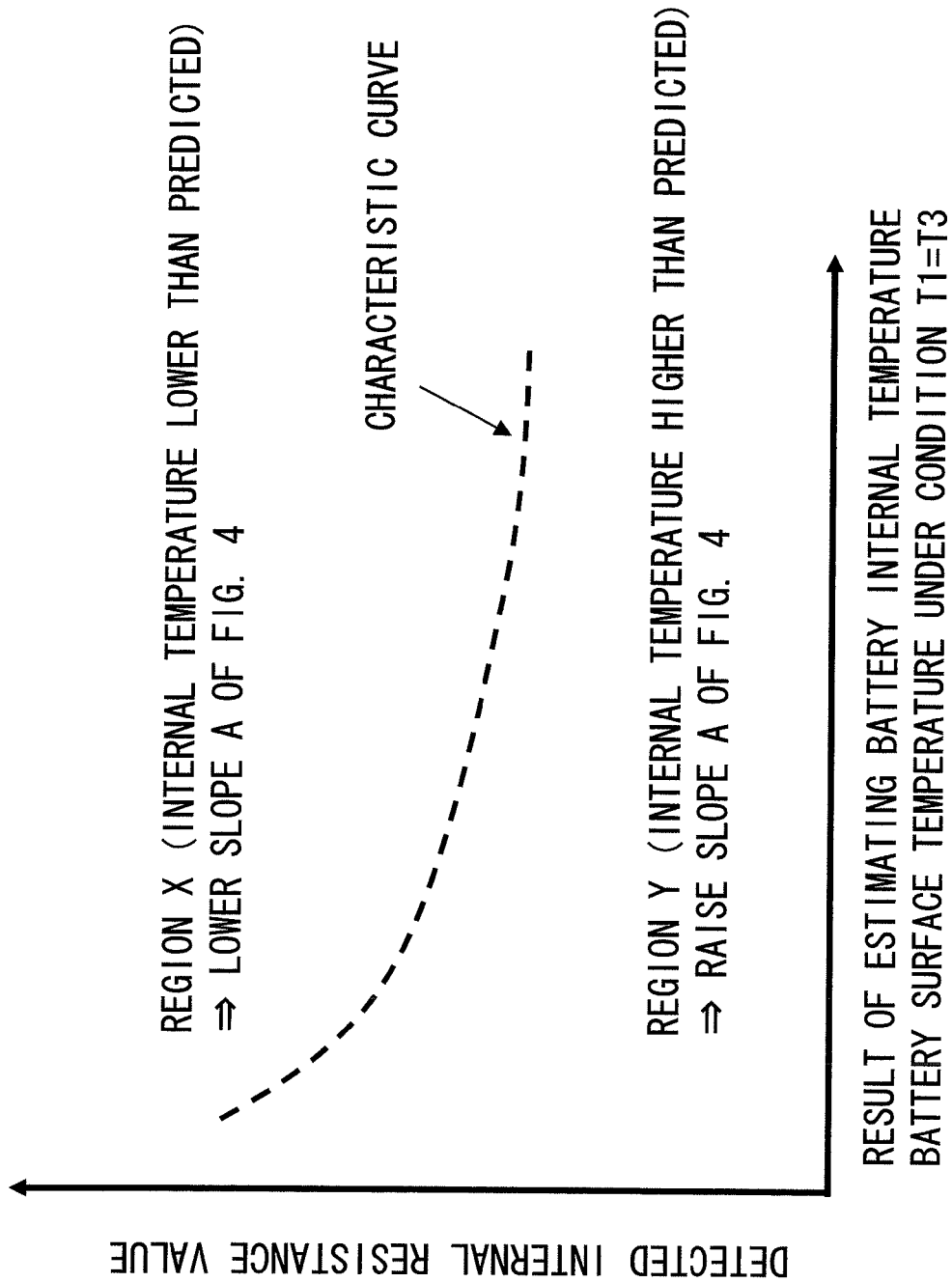
FIG. 22 is a figure for explanation of the operation of a parameter correction unit 2101 of this fourth embodiment.

The operation of this parameter correction unit 2101 of the fourth embodiment will now be explained with reference to FIG. 22. In FIG. 22, the result T3 of estimating the battery internal temperature and the battery surface temperature T1 under the condition that T1=T3 are shown along the horizontal axis, while the result R or R' of detecting the internal resistance is shown along the vertical axis. Moreover, the characteristic curve in the figure shows the change with respect to temperature of the internal resistance detected under the condition that the battery surface temperature T1 is equal to the battery internal temperature T3. If the result T3 of estimation of the internal temperature by the internal temperature estimation unit 301 is correct, then the change of the internal resistance R with respect to the result T3 of estimating the internal temperature part way through charging and discharging must exhibit a tendency close to the characteristic curve in the figure. But if the assembled battery 101 is deteriorated, then, by the method explained for the first embodiment or the second embodiment, the characteristic curve is updated so as to accord with the present characteristic of the assembled battery 101, and diagnosis is performed using this updated characteristic curve.

If it has been determined by the internal temperature diagnosis unit 306 that the result T3 of estimation of the internal temperature by the internal temperature estimation unit 301 is anomalous, then the parameter correction unit 2101 corrects the parameters for internal temperature estimation used by the internal temperature estimation unit 301 in a direction in which the accuracy of estimating the internal temperature is enhanced. As an example, devices of various types that use the assembled battery 101 are started and the battery control circuit 106B starts, the internal temperature estimation unit 301 performs estimation of the internal temperature T3, and the internal resistance calculation unit 303 obtains the internal resistance R. If the detected values of the internal resistance R are distributed in the region X of FIG. 22, then the slope A used by the internal temperature estimation unit 301 (refer to FIG. 4) is corrected in the direction to lower it. On the other hand, if the detected values of the internal resistance R are distributed in the region Y of FIG. 22, then the slope A is corrected in the direction to raise it. With this parameter correction unit 2101, if it has been determined by the internal temperature diagnosis unit 306 that the result of estimation of the internal temperature by the internal temperature estimation unit 301 is anomalous, then it is possible to correct the parameters for internal temperature estimation used by the internal temperature estimation unit 301 in the direction in which the error improves, so that it is possible to maintain the accuracy of estimation of the internal temperature by performing this correction of the parameters.

Embodiment #5

Figure 23:
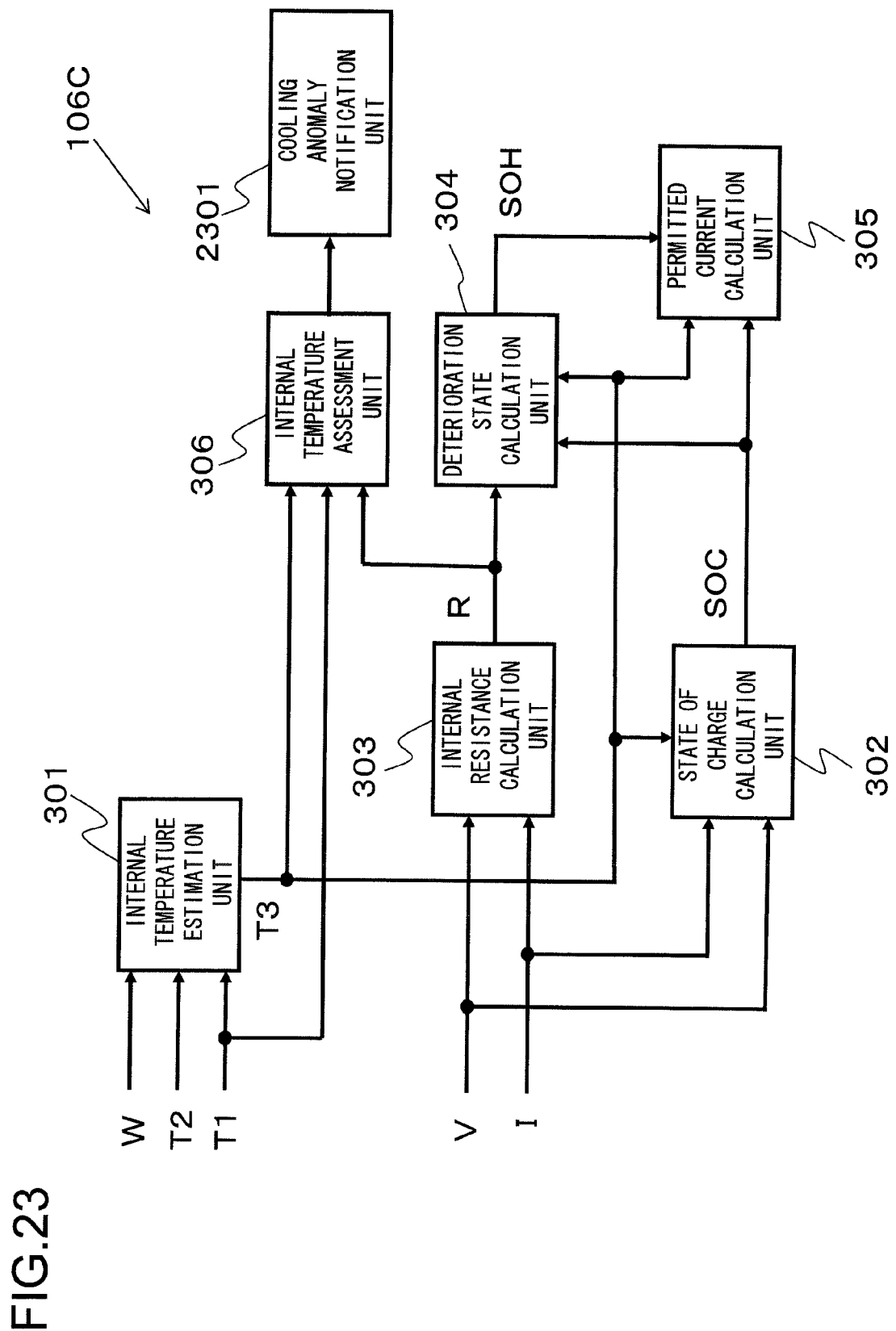
FIG. 23 is a block diagram showing the details of processing performed by a battery control circuit 106C of a fifth embodiment.

As described above, the estimation of the internal temperature T3 by the internal temperature estimation unit 301 is performed on the basis of the battery surface temperature T1, the temperature T2 of the battery surroundings, and the speed of the cooling air draft W. Accordingly, one possible cause of the result T3 of estimation of the battery internal temperature becoming anomalous could be an anomaly in the cooling operation performed by the fan 203 shown in FIG. 2. Thus, in this fifth embodiment, a cooling anomaly of the assembled battery 101 is notified if the internal temperature diagnosis unit 306 has determined that the result T3 of estimation of the internal temperature is anomalous. FIG. 23 shows the details of processing performed by a battery control circuit 106C of this fifth embodiment. In this fifth embodiment, the diagnosis processing is performed by this battery control circuit 106C, in which a cooling anomaly notification unit 2301 has been added to the battery control circuit 106 of the first and second embodiments shown in FIG. 3.

Figure 24:
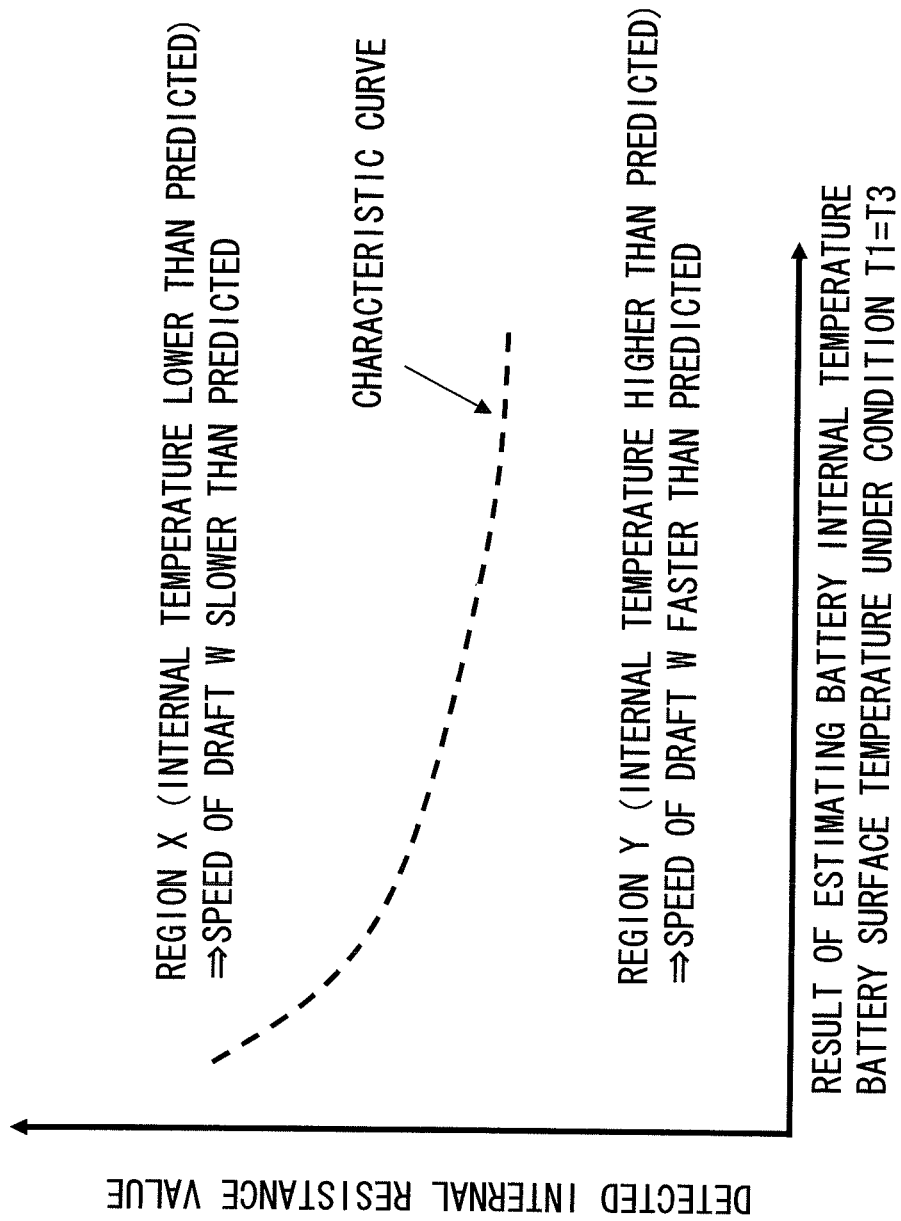
FIG. 24 is a figure for explanation of the operation of a cooling anomaly notification unit 2301.

The operation of this cooling anomaly notification unit 2301 will now be explained with reference to FIG. 24. In FIG. 24, the result T3 of estimating the battery internal temperature and the battery surface temperature T1 under the condition that T1=T3 are shown along the horizontal axis, while the result R or R' of detecting the internal resistance is shown along the vertical axis. If it has been determined by the internal temperature diagnosis unit 306 that the estimated internal temperature result T3 is anomalous, then the cooling anomaly notification unit 2301 checks the relationship between the result T3 of estimation of the internal temperature by the internal temperature estimation unit 301 and the result R of detection of the internal resistance by the internal resistance calculation unit 303. As shown in FIG. 24, if the detected value of the internal resistance R is plotted in the region X, then this shows that the internal resistance R is greater than predicted, in other words shows that the result T3 of estimation of the battery internal temperature is lower than predicted (refer to FIG. 9 for the relationship between the temperature and the resistance). As shown in FIG. 4, the internal temperature T3 of the battery is estimated on the basis of the relationship of the slope A that corresponds to the speed W of the cooling air draft, but the fact that the actual battery internal temperature is smaller than the estimated result T3 means that it can be determined that the slope A is smaller than predicted, in other words that the actual speed W of the draft is not faster than supposed. Due to this, in the cooling by the fan 203 that is installed to the battery module 102, the cooling anomaly notification unit 2301 compares with the set value for the speed of draft, and determines that the speed of draft is anomalous because it is not sufficient. This is a state in which the actual driving of the fan 203 is weak with respect to the drive signal for the fan 203 (i.e. the set value for the speed of draft) that is generated from the battery control circuit 106C or from an external controller (for example, the vehicle control circuit 109). The result of detection by the cooling anomaly notification unit 2301 is either transmitted via the battery control circuit 106C to the vehicle control circuit 109, or is directly transmitted to the vehicle control circuit 109.

On the other hand, if the detected value R of the internal resistance with respect to the result T3 of estimating the internal temperature is plotted in the region Y of FIG. 24, then this shows that the internal resistance R is smaller than predicted, in other words that the result T3 of estimation of the battery internal temperature is higher than predicted, and this also shows that the slope A shown in FIG. 4 corresponding to the speed of draft W is larger than predicted. The cooling anomaly notification unit 2301 determines that the speed of draft W of the fan 203 that cools the battery module 102 is excessively great. It is considered that this implies a state in which the fan 203 is being driven too fast in terms of the drive signal (the speed of draft set value) for the fan 203 generated from the battery control circuit 106C or from an external controller (for example from the vehicle control circuit 109), and accordingly it is considered that a fault has occurred such as the fan 203 not having stopped even though a stop command for the fan 203 has been issued, or the like. And the cooling anomaly notification unit 2301 transmits this anomaly information to the vehicle control circuit 109.

According to the fifth embodiment as described above, on the basis of the result of decision by the internal temperature diagnosis unit 306, the cooling anomaly notification unit 2301 is able to detect the fact that the driving of the fan is weak, or is excessively high, and is able to issue a notification thereof to the exterior.

Embodiment #6

Figure 25:
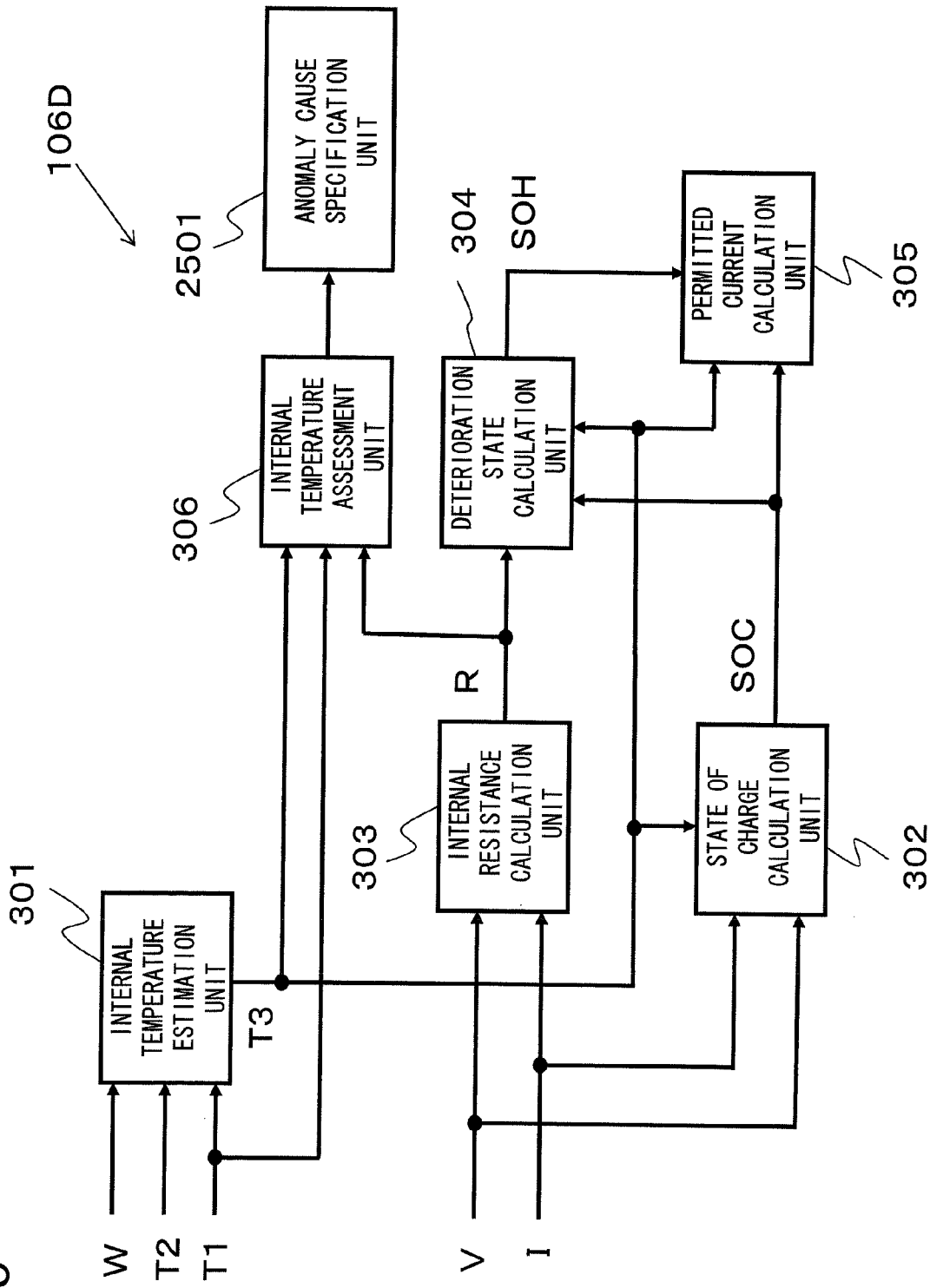
FIG. 25 is a block diagram showing the details of processing performed by a battery control circuit 106D of a sixth embodiment.

A sixth embodiment will now be explained in which, if it has been decided that the result T3 of estimating the internal temperature is anomalous, it is arranged to specify the cause of the anomaly on the basis of the detected internal resistance value R with respect to the result T3 of estimating the internal temperature. In this sixth embodiment, as shown in FIG. 25, the diagnosis processing is performed by a battery control circuit 106D, in which an anomaly cause specification unit 2501 has been added to the battery control circuit 106 of the first and second embodiments shown in FIG. 3.

Figure 26:
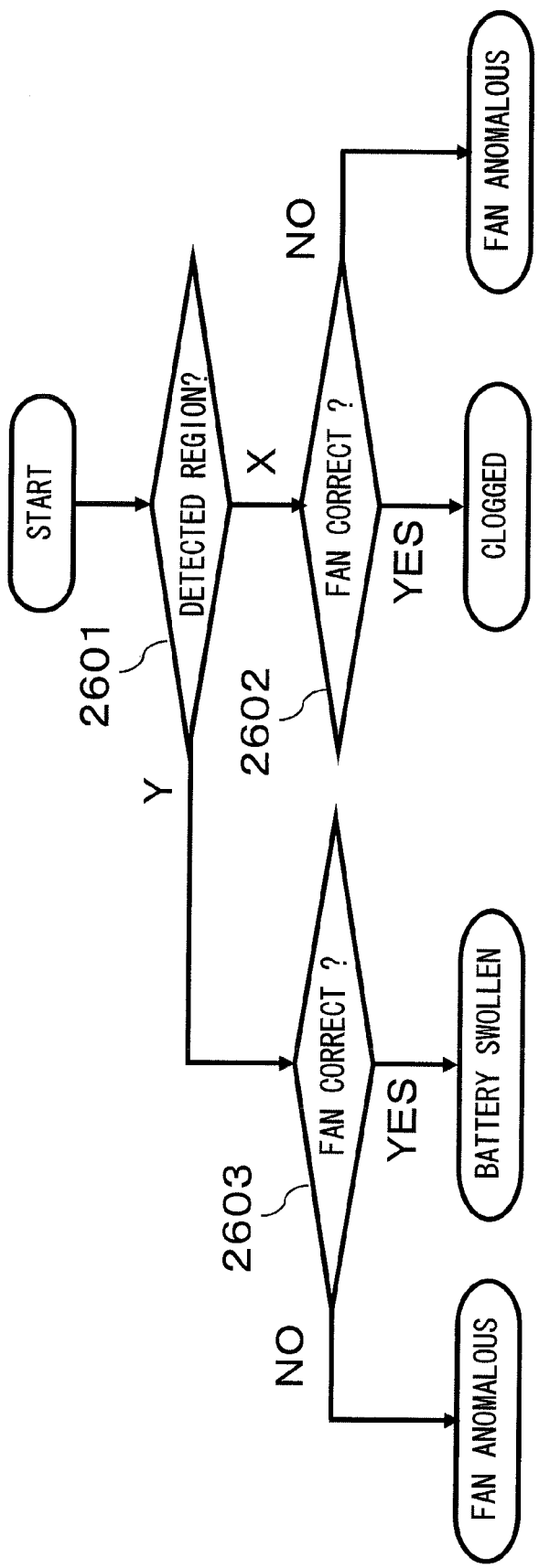
FIG. 26 is a flow chart for anomaly cause specification processing performed by an anomaly cause specification unit 2501.

FIG. 26 is a flow chart showing anomaly cause specification processing performed by the anomaly cause specification unit 2501. If it has been decided by the internal temperature diagnosis unit 306 that the result T3 of estimation of the internal temperature is anomalous, then in a step 2601 the anomaly cause specification unit 2501 checks the relationship between the result T3 of estimating the internal temperature and the detected value R of the internal resistance. And, as shown in FIG. 24, it makes a decision as to whether the internal resistance R is greater than predicted, in other words the result T3 of estimation of the internal temperature is in the region lower than predicted (i.e. the region X), or the internal resistance R is smaller than predicted, in other words that the result T3 of estimation of the internal temperature is in the region higher than predicted (i.e. the region Y).

If it has been determined that the detected value R of the internal resistance with respect to the result T3 of estimation of the internal temperature is in the region X, then the flow of control proceeds to a step 2602, in which it is checked whether the fan 203 is operating correctly in terms of the set speed of draft. This checking of the operation of the fan 203 may be implemented by receiving a signal from the fan 203, as shown in FIG. 2. For example, the duty ratio of the signal from the fan may be checked, or its pulse width may be checked. It should be understood that, provided that it is possible to confirm the operation of the fan 203, some other diagnosis method would also be acceptable; the diagnosis method described above should not be considered as being limitative. If an anomaly is discovered in the drive state of the fan 203, then it is decided that the fan 203 is anomalous. But if no anomaly is discovered in the drive state of the fan 203, then this means that the speed of draft is insufficient (the region X) even though the fan is in the state of operating correctly at its set speed of draft, and it is decided that clogging of a filter that is provided to the air entrance (i.e. to the intake aperture) for performing cooling of the battery module 102 is the cause. Thus, the anomaly cause specification unit 2501 decides that clogging of the filter is the cause of the anomalous result T3 for the estimated internal temperature.

On the other hand, if in the step 2601 it has been determined that the detected value of the internal resistance R corresponding to the result T3 of estimation of the internal temperature is in the region Y, then the flow of control proceeds to a step 2603, in which it is checked whether the fan 203 is operating correctly at its set speed of draft. This checking of the operation of the fan 203 may be implemented in a similar manner to the processing described above for the region X, i.e. by analyzing the signal from the fan 203. If an anomaly is discovered in the drive state of the fan 203, then it is decided that the fan 203 is anomalous. But if no anomaly is discovered in the drive state of the fan 203, then, irrespective of whether the fan is in the state of operating correctly at its set speed of draft, this means that the speed of draft W is excessive (the region Y). However, it is difficult to imagine that there is any possibility that an excessive speed of draft W can be obtained even though the fan 203 is operating correctly.

Now, if the assembled battery 101 is shaped as a parallelepiped, then there is a possibility that after a long period of use its shape may change, in concrete terms that it may swell up. If the assembled battery 101 swells up, then transmission of temperature from the interior of the assembled battery 101 to its surface becomes worse than normal. As a result, the slope A of the relationship between the battery surface temperature T1 and the battery internal temperature T3 becomes different from what was supposed. That is to say, the difference between the surface temperature of the assembled battery 101 and its internal temperature becomes greater than was supposed (this corresponds to the region Y). Thus, if the anomaly cause specification unit 2501 determines that there is an anomaly in the region Y and moreover no anomaly has been determined for the fan 203, then it is decided that the cause of the anomaly is because the parallelepipedal shape of the assembled battery 101 has changed (i.e. because it has swollen up).

With this sixth embodiment, by using the anomaly cause specification unit 2501, it becomes possible to specify the cause for occurrence of an anomaly in the result T3 of estimation of the internal temperature of the assembled battery 101.

It should be understood that although, in the embodiments described above, the battery control device of the present invention has been applied to a motor drive system for a vehicle, the battery control device and the motor drive system of the present invention are not to be considered as only being limited to use in a vehicle such as an electric automobile or a hybrid electric automobile or the like, since it would also be possible to apply them over a broad field of motor drive systems, such as a system for general industrial use, a system for a mobile, a system for a UPS, or the like, and it would still be possible to obtain excellent beneficial effects such as those described above.

It should be understood that the embodiments and variant embodiments described above may be applied either individually, or in any combination. Moreover, the present invention should not be considered as being limited to these embodiments and variant embodiments; other modes of embodiment that are considered to fall within the technical concept of the present invention are also included within the range of the present invention.

According to the embodiments and variant embodiments described above, it is possible to obtain beneficial operational effects as described below. First, it is arranged to store the surface temperature T1 of the assembled battery 101, detected under the condition that the difference between the surface temperature T1 of the assembled battery 101 and its internal temperature T3 is less than or equal to the predetermined value, and the internal resistance R' in the memory 106b in mutual correspondence. It is arranged for the internal temperature diagnosis unit 306, which diagnoses whether or not the internal temperature T3 of the assembled battery 101 estimated by the internal temperature estimation unit 301 is correct, to detect the internal resistance R with the internal resistance calculation unit 303 when the internal temperature T3 is estimated by the internal temperature estimation unit 301, and also to search, from among the internal resistances R' that are stored in the memory 106b, for the internal resistance R' corresponding to the surface temperature T1 that is equal to this estimated internal temperature value T3, and to assess the estimated internal temperature value T3 on the basis of the result of comparison between the internal resistance R' that is the result of this search and the internal resistance R during the estimation of internal temperature. Accordingly it is possible to assess in an accurate manner the reliability of the estimated value T3 of the internal temperature of the assembled battery 101, and it is possible to detect the state of the assembled battery 101 in an accurate manner on the basis of this estimated value T3 of the internal temperature whose reliability is high.

Moreover since, according to the embodiments and variant embodiments described above, it is arranged for the internal temperature diagnosis unit 306 to assess that the estimated value T3 for the internal temperature is anomalous when the difference between the internal resistance R' that is the search result and the internal resistance R during internal temperature estimation is greater than the predetermined value, accordingly it is possible to assess an anomaly of the value T3 of estimation of the internal temperature of the assembled battery 101 in an accurate manner, and it is possible to detect the state of the assembled battery 101 in an accurate manner or the basis of an estimated value T3 for the internal temperature whose reliability is high.

According to the embodiments and variant embodiments described above, it is arranged to decide whether or not the difference between the surface temperature T1 of the assembled battery 101 and its internal temperature T3 is within the predetermined value. It is arranged to store the surface temperature T1 of the assembled battery 101 that has been detected and the internal resistance R' that has been detected by the internal resistance calculation unit 303 in mutual correspondence in the memory 106b, if it has been decided that this condition is satisfied. Accordingly it is possible to accumulate, in an accurate manner and moreover simply and easily, historical data for the internal temperature R' and the surface temperature T1 that satisfy the condition that the difference between the surface temperature T1 of the assembled battery 101 and its internal temperature T3 is within the predetermined value, and thus it is possible to enhance the accuracy of diagnosis of anomaly of the estimated value T3 of the internal temperature.

And since, according to the embodiments and variant embodiments described above, it is arranged to decide that the condition in which the difference between the surface temperature T1 of the assembled battery 101 and its internal temperature T3 is within the predetermined value is satisfied if the difference between the detected value for the surface temperature of the assembled battery 101 and the detected value for the temperature of its surroundings is within the predetermined value, accordingly it is possible to make the decision relating to the condition in which the difference between the surface temperature T1 of the assembled battery 101 and its internal temperature T3 is within the predetermined value in a simple and also accurate manner.

According to the embodiments and variant embodiments described above, it is arranged to detect the surface temperature T1 of the assembled battery 101, and also to detect the internal resistance R' of the assembled battery 101 with the internal resistance calculation unit 303, and to update the surface temperature T1 and the internal resistance R' stored in the memory 106b on the basis of these detected values for the surface temperature T1 and the internal resistance R', when it has been decided that the condition in which the difference between the surface temperature T1 of the assembled battery 101 and its internal temperature T3 is within the predetermined value is satisfied. Accordingly it is possible to prepare history data for the internal resistance R' that accurately reflects change of the internal resistance originating due to deterioration of the assembled battery 101, and it is possible to assess the reliability of the value T3 of estimation of the internal temperature value of the assembled battery 101 in an accurate manner even if the assembled battery 101 has deteriorated along with the passage of time, so that it is possible to detect the state of the assembled battery 101 for some considerable time in an accurate manner on the basis of an estimated value T3 for the internal temperature whose reliability is high.

And since, according to the embodiments and variant embodiments described above, it is arranged to estimate the internal temperature T3 of the assembled battery 101 on the basis of the detected value of the surface temperature of the assembled battery 101, the detected value of the temperature of its surroundings, the detected value of the speed of the cooling air draft that cools the assembled battery 101, and the parameter for internal temperature estimation, accordingly it is possible to estimate the internal temperature of the assembled battery 101 in an accurate manner.

According to the embodiments and variant embodiments described above, it is arranged for the parameter for internal temperature estimation to be the slope A whose primary function is to specify the relationship of the difference between the internal temperature of the assembled battery 101 and the temperature of its surroundings with respect to the difference between the surface temperature of the assembled battery 101 and the temperature of its surroundings, and to have a value that corresponds to the speed of the cooling air draft. It is arranged for the internal temperature estimation unit 301 to correct this parameter A for internal temperature estimation if it has been assessed by the internal temperature diagnosis unit 306 that the value T3 of the estimated internal temperature is anomalous. Accordingly it is possible to maintain the accuracy of estimation of the estimated value T3 for the internal temperature in a high state for some considerable time, even if there is considerable deterioration or the like of the assembled battery.

And since, according to the embodiments and variant embodiments described above, it is arranged to limit the charging and discharging currents that flow in the assembled battery 101 if it has been assessed by the internal temperature diagnosis unit 306 that the estimated value T3 for the internal temperature is anomalous, accordingly it is possible to enhance the reliability of a motor drive system that uses this assembled battery 101.

And since, according to the embodiments and variant embodiments described above, if it has been decided by the internal temperature diagnosis unit 306 that the estimated internal temperature value T3 is anomalous, then it is arranged to specify the cause of this anomaly of the value T3 of the estimated internal temperature on the basis of the magnitude relationship between the detected internal resistance value R that was detected by the internal resistance calculation unit 303 when the internal temperature T3 was estimated by the internal temperature estimation unit 301, and the internal resistance value R' that has been searched from the memory 106b corresponding to the surface temperature T1 that is equal to the estimated internal temperature value T3, accordingly it is possible to ascertain the cause of the anomaly in the estimated value T3 of the internal temperature.

The invention claimed is:
1. A battery control device, comprising:
an internal resistance detection unit that detects the internal resistance of a battery;
a surface temperature detection unit that detects the surface temperature of the battery;
an internal temperature estimation unit that estimates the internal temperature of the battery;
a data storage unit that stores the surface temperature detected by the surface temperature detection unit and the internal resistance detected by the internal resistance detection unit in mutual correspondence, the surface temperature and the internal temperature being detected under a condition in which a difference between the surface temperature of the battery and the internal temperature of the battery is within a predetermined value; and an internal temperature diagnosis unit that diagnoses whether or not the internal temperature of the battery estimated by the internal temperature estimation unit is correct; wherein the internal temperature diagnosis unit, along with detecting with the internal resistance detection unit the internal resistance when the internal temperature was estimated by the internal temperature estimation unit, also searches for the internal resistance that corresponds to the surface temperature that is equal to the estimated internal temperature value from among the internal resistances stored in the data storage unit, and diagnoses the estimated internal temperature value on the basis of the result of comparison between the internal resistance that is a result of this search and the internal resistance detected during this internal temperature estimation.

2. A battery control device according to claim 1, wherein the internal temperature diagnosis unit diagnoses that the estimated internal temperature value is anomalous if a difference between the internal resistance that is the result of the search and the internal resistance during this internal temperature estimation is greater than a predetermined value.

3. A battery control device according to claim 1, further comprising:
a state determination unit that makes a decision as to whether or not the condition in which the difference between the surface temperature of the battery and its internal temperature is within the predetermined value is satisfied; and
a data accumulation unit that stores the surface temperature detected by the surface temperature detection unit and the internal resistance detected by the internal resistance detection unit in mutual correspondence if the state determination unit decides that the condition is satisfied.

4. A battery control device according to claim 3, wherein the state determination unit comprises a surrounding temperature detection unit that detects a temperature of surroundings of the battery, and decides that the condition is satisfied if a difference between a value of the surface temperature detected by the surface temperature detection unit and a value of the surrounding temperature detected by the surrounding temperature detection unit is within a predetermined value.

5. A battery control device according to claim 3, further comprising
a data updating unit that, along with detecting the surface temperature of the battery by the surface temperature detection unit, also detects the internal resistance of the battery with the internal resistance detection unit, and updates the surface temperature and the internal resistance stored in the data storage unit on the basis of a value of this detected surface temperature and a value of this detected internal resistance when the state determination unit determines that the condition is satisfied.

6. A battery control device according to claim 1, wherein:
the internal temperature estimation unit comprises:
a surrounding temperature detection unit that detects a temperature of surroundings of the battery; and
a speed of draft detection unit that detects the speed of draft of a cooling fan that cools the battery; and
the internal temperature estimation unit estimates the internal temperature of the battery on the basis of a value of the surface temperature detected by the surface temperature detection unit, a value of the surrounding temperature detected by the surrounding temperature detection unit, a value of the speed of draft detected by the speed of draft detection unit, and a parameter for internal temperature estimation.

7. A battery control device according to claim 6, wherein:
the parameter for internal temperature estimation is configured to be a slope that primarily functions to specify the relationship of a difference between the internal temperature of the battery and the temperature of surroundings of the battery with respect to a difference between the surface temperature of the battery and the temperature of surroundings of the battery, and to have a value that corresponds to the speed of the cooling draft; and
the internal temperature estimation unit corrects the parameter for internal temperature estimation, if the internal temperature diagnosis unit diagnoses that the estimated internal temperature value is anomalous.

8. A battery control device according to claim 1, further comprising
a current limitation unit that limits charging or discharging current flowing in the battery, if the internal temperature diagnosis unit of the battery control device diagnoses that the estimated internal temperature value is anomalous.

9. A motor drive system, comprising:
a battery;
a draft blowing unit that blows a cooling air draft through a filter against the battery;
and a battery control device according to claim 1.

10. A motor drive system according to claim 9, further comprising
a cause specification unit that specifies a cause of an anomaly of a value of the estimated internal temperature on the basis of magnitude relationship between a value of the internal resistance and a value of the searched internal resistance if the internal temperature diagnosis unit diagnoses that value of the estimated internal temperature is anomalous, the value of the estimated internal temperature being detected by the internal resistance detection unit when the internal temperature was estimated by the internal temperature estimation unit, and the value of the searched internal resistance that corresponds to the surface temperature equal to the value of the estimated internal temperature being searched from the data storage unit.

11. A motor drive system according to claim 10, wherein the cause specification unit: specifies that the cause is insufficiency of the speed of the draft blown by the draft blowing unit, or that the filter is clogged, if the value of the detected internal resistance is larger than the value of the searched internal resistance; and specifies that the cause is that the speed of the draft blown by the draft blowing unit is excessively great, or the battery has swollen if the value of the detected internal resistance is smaller than the value of the searched internal resistance.

12. A battery control device according to claim 2, further comprising:
a state determination unit that makes a decision as to whether or not the condition in which the difference between the surface temperature of the battery and its internal temperature is within the predetermined value is satisfied; and
a data accumulation unit that stores the surface temperature detected by the surface temperature detection unit and the internal resistance detected by the internal resistance detection unit in mutual correspondence if the state determination unit decides that the condition is satisfied.

13. A battery control device according to claim 4, further comprising a data updating unit that, along with detecting the surface temperature of the battery by the surface temperature detection unit, also detects the internal resistance of the battery with the internal resistance detection unit, and updates the surface temperature and the internal resistance stored in the data storage unit on the basis of a value of this detected surface temperature and a value of this detected internal resistance when the state determination unit determines that the condition is satisfied.

\* \* \* \* \*